(12) United States Patent
Konishi et al.

(10) Patent No.: US 6,256,167 B1
(45) Date of Patent: Jul. 3, 2001

(54) MAGNETIC RECORDING/REPRODUCTION APPARATUS HAVING A MECHANISM FOR PULLING A MAGNETIC TAPE OUT OF A CASSETTE

(75) Inventors: Akio Konishi, Sanda; Yoshiyuki Saito, Katano; Takefumi Yanagihara, Saijo, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/270,478

(22) Filed: Mar. 15, 1999

(30) Foreign Application Priority Data

Mar. 19, 1998 (JP) .................................. 10-070170

(51) Int. Cl.[7] .................................................. G11B 15/61
(52) U.S. Cl. ........................................ 360/130.23; 360/95
(58) Field of Search ............... 360/85, 95, 130.2–130.23

(56) References Cited

U.S. PATENT DOCUMENTS 5,953,185 * 9/1999 Lee ................................... 360/130.23

FOREIGN PATENT DOCUMENTS 7-282427 * 10/1995 (JP) .

* cited by examiner

*Primary Examiner*—Jefferson Evans
(74) *Attorney, Agent, or Firm*—Renner, Otto, Boisselle & Sklar, LLP

(57) ABSTRACT

An apparatus of the present invention is a magnetic recording/reproduction apparatus for pulling out a magnetic tape from a cassette, forming a predetermined tape drive system with a group of tape guide posts while winding the magnetic tape around a rotary head cylinder, having a rotary head, for a predetermined arc, so as to perform recording/reproduction of the magnetic tape. The apparatus includes: an inclined post around which a non-magnetic side of the magnetic tape from the rotary head cylinder is wound; a rail provided integrally with a base on which the rotary head cylinder is mounted; and a tape guide post carrier which has the inclined post mounted thereon and is guided along the rail. The inclined post is a tape guide post around which the winding contact line, along which the magnetic tape contacts the tape guide post, is not perpendicular to a tape drive direction. The inclined post has a tapered tip portion whose diameter upwardly decreases, wherein an upper edge of the magnetic tape is between a base of the tapered tip portion and a tip of the tapered tip portion.

1 Claim, 35 Drawing Sheets

MAGNETIC RECORDING/REPRODUCTION APPARATUS HAVING A MECHANISM FOR PULLING A MAGNETIC TAPE OUT OF A CASSETTE

BACKGROUND OF THE INVENTION

1. Field of the Invention

The present invention relates to a magnetic recording/reproduction apparatus.

2. Description of the Related Art

A conventional magnetic recording/reproduction apparatus disclosed in Japanese Laid-Open Utility Model Publication No. 61-203443 will be described with reference to FIGS. 37 and 38.

FIG. 37 illustrates the conventional magnetic recording/reproduction apparatus in an eject position where a magnetic tape cassette can be mounted on a moving chassis 201, and FIG. 38 illustrates the magnetic recording/reproduction apparatus in a loaded position where a magnetic tape is wound around a rotary head drum, and the apparatus is ready to perform a magnetic recording/reproduction operation.

Referring to FIG. 37, the magnetic recording/reproduction apparatus includes a fixed chassis 217, the moving chassis 201, a rotary head drum 218 having a rotary head, a magnetic tape 273, a supply reel base 203a, a take-up reel base 203b, a tape cassette 277, and tape loading sections 227a and 227b each having a rotation guide 229 and an inclined guide 230. As the tape loading sections 227a and 227b move along guide rails 209a and 209b from the position shown in FIG. 37 to the position shown in FIG. 38, and the moving chassis 201 moves along the direction indicated by an arrow C in FIG. 38, the magnetic tape 273 is pulled out from the tape cassette 277 and wound around the rotary head drum 218, thereby establishing the loaded position shown in FIG. 38 where the magnetic recording/reproduction apparatus is ready to perform a magnetic recording/reproduction operation.

In such a tape loading apparatus, the tape loading sections 227a and 227b generally need a predetermined gap in the thickness direction so that they can smoothly slide along the guide rails 209a and 209b. Therefore, the tape loading sections 227a and 227b have some play with respect to the rotation guide 229 and the inclined guide 230. Accordingly, the tip of the inclined guide 230 can incline in a direction toward the rotary head drum 218 during a loading operation.

As can be seen from FIGS. 37 and 38, the inclined guide 230 has a cylindrical shape.

In such a conventional structure, however, as the inclined guide 230 inclines in a direction toward the rotary head drum 218 during a loading operation, the inclined guide 230 may contact and damage the rotary head drum 218 and possibly the head which are in a high speed rotation. This is generally shown in FIG. 39, which illustrates a head 501 being in rotation. As illustrated in FIG. 39, when the inclined guide 230 inadvertently contacts an upper drum 218a ("rotary drum"), the inclined guide 230 may damage the upper drum 218a and the head 501 (not shown in FIG. 39).

In order to avoid this, different approaches have been taken, including the following. For example, the respective loading tracks of the tape loading members 227a and 227b may be sufficiently spaced from the rotary head drum 218. Alternatively, the proximity of the inclined guide 230 to the rotary head drum 218 may be reduced by reducing the play of the tape loading members 227a and 227b by reducing or eliminating the gap in the thickness direction between the guide rails 209a and 209b and the tape loading members 227a and 227b.

However, spacing the loading track away from the rotary head drum 218 may inhibit downsizing of the mechanism. Moreover, reducing or eliminating the gap between the tape loading members 227a and 227b and the guide rails 209a and 209b may increase the load of a loading operation and thus the drive force required from a power source (which is typically a motor). Therefore, the power consumption of the apparatus may increase, and/or a large motor may be required, thereby inhibiting downsizing of the mechanism.

SUMMARY OF THE INVENTION

According to one aspect of this invention, a magnetic recording/reproduction apparatus is provided for pulling out a magnetic tape from a cassette, forming a predetermined tape drive system with a group of tape guide posts while winding the magnetic tape around a rotary head cylinder, having a rotary head, for a predetermined arc, so as to perform recording/reproduction of the magnetic tape. The apparatus includes: an inclined post around which a non-magnetic side of the magnetic tape from the rotary head cylinder is wound; a rail provided integrally with a base on which the rotary head cylinder is mounted; and a tape guide post carrier which has the inclined post mounted thereon and is guided along the rail. The inclined post is a tape guide post around which the winding contact line, along which the magnetic tape contacts the tape guide post, is not perpendicular to a tape drive direction. The inclined post has a tapered tip portion whose diameter upwardly decreases, wherein an upper edge of the magnetic tape is between a base of the tapered tip portion and a tip of the tapered tip portion.

As described above, the magnetic recording/reproduction apparatus of the present invention has an inclined post with the tip thereof being upwardly tapered.

With such a structure, it is possible to prevent the rotary head drum and the head from being inadvertently damaged during a loading operation, without increasing the mechanism size or the load of the loading operation.

Thus, the invention described herein makes possible the advantage of providing a magnetic recording/reproduction apparatus incorporating a reliable, low-power-consumption, small-sized mechanism in which the inclined guide is upwardly tapered so as to prevent a rotary head drum and a head from being inadvertently damaged.

This and other advantages of the present invention will become apparent to those skilled in the art upon reading and understanding the following detailed description with reference to the accompanying figures.

DESCRIPTION OF THE PREFERRED EMBODIMENTS

A magnetic recording/reproduction apparatus according to an embodiment of the present invention will now be described.

The magnetic recording/reproduction apparatus according to the embodiment of the present invention magnetically records/reproduces data to/from a magnetic tape by pulling out the magnetic tape from a cassette and forming a predetermined tape drive system with a group of tape guide posts, while winding the magnetic tape around a rotary head cylinder, having a rotary head, for a predetermined arc.

The magnetic recording/reproduction apparatus of the present invention includes an inclined post around which the non-magnetic surface of the magnetic tape from the rotary head cylinder is wound, a rail provided integrally with a base on which the rotary head cylinder is mounted, and a tape guide post carrier which has the inclined post mounted thereon and is guided along the rail. The inclined post is a tape guide post around which the winding contact line (along which the magnetic tape contacts the tape guide post) is not perpendicular to the tape drive direction. The inclined post has a tip which is tapered so that the diameter thereof decreases upwardly. A portion of the inclined post which is to be in contact with a magnetic tape may not be tapered.

Because of the tapered shape of the tip of the inclined post, it is possible to prevent the rotary head drum and the head from being damaged during a loading operation without increasing the size of the mechanism of the magnetic recording/reproduction apparatus and the load of the loading operation.

The "recording/reproduction" of a magnetic tape as used herein means at least one of recording data on the magnetic tape and reproducing data from the magnetic tape. Moreover, "data" as used herein includes at least one of image data, sound data, time data, location data, control data and program data. The "tape cassette" as used herein includes any type of cassette to/from which data can be recorded/reproduced, such as a DVC (digital video cassette), an 8 mm video cassette, a VHS cassette, and the like.

The magnetic recording/reproduction apparatus of the present invention will now be described in detail with reference to FIGS. 1 to 36. Note that a T1 post 46 is illustrated in all the figures except for FIG. 36 as being cylindrical for the sake of simplicity, but the T1 post 46 actually has a tapered tip as illustrated in FIG. 36.

Figure 1:
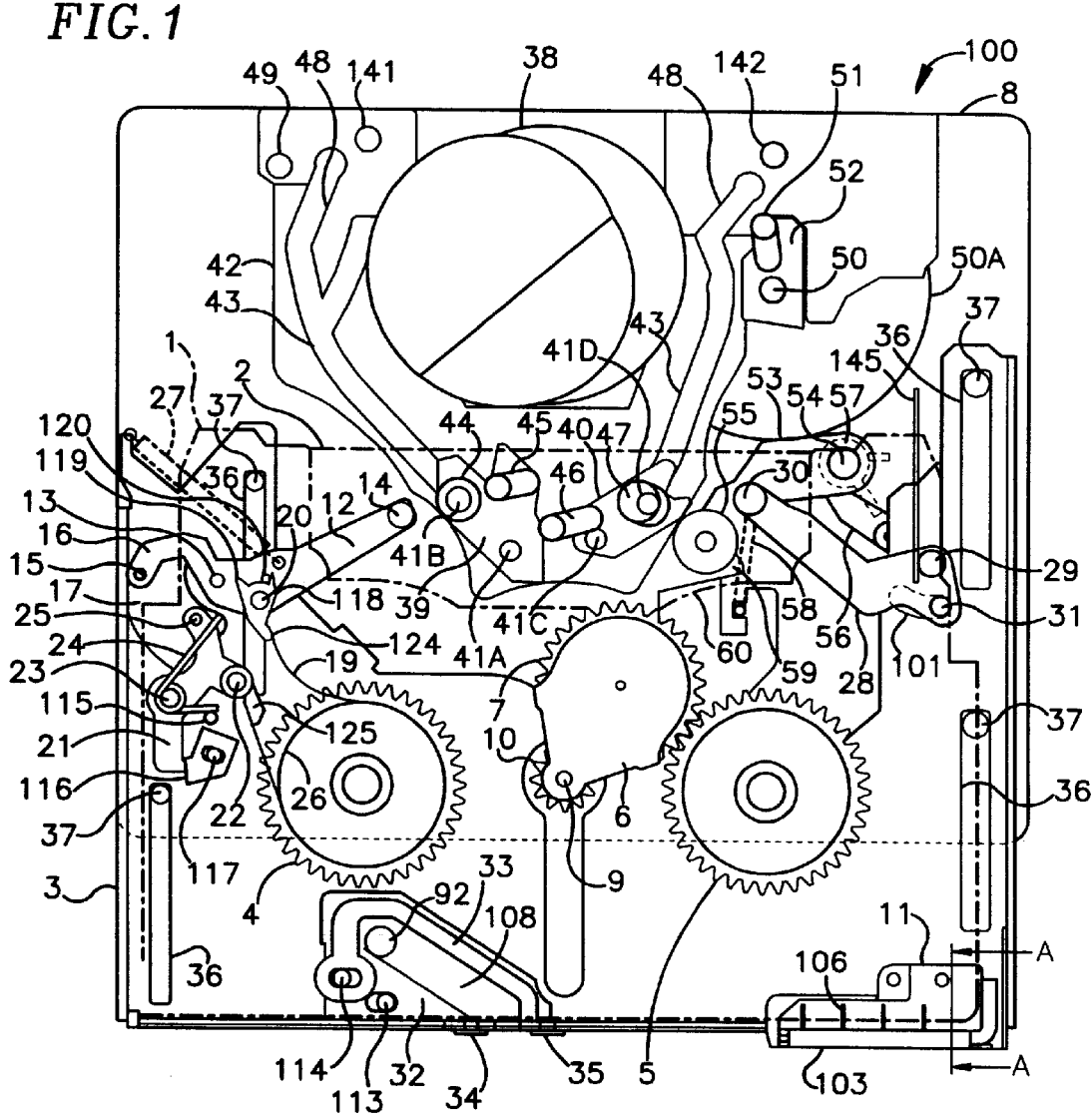
FIG. 1 is a plan view illustrating a magnetic recording/reproduction apparatus according to an embodiment of the present invention in an unloaded mode where a cassette Is removed therefrom.

FIG. 1 Is a plan view illustrating the present embodiment of the invention in a position where a cassette is unloaded (hereinafter, referred to also as the "unloaded mode"). For the sake of simplicity, some elements of the magnetic recording/reproduction apparatus are not shown in FIG. 1.

A tape 2 is wound around two reels (not shown) housed in a cassette 1, so that a portion of the tape 2 between the reels is placed under tension. In the Figures, the cassette 1 is illustrated only by its profile in a one dot chain line, and a portion of the tape 2 existing outside the cassette 1 is also shown in a one dot chain line, for the sake of simplicity.

The cassette 1 is attached to a subchassis 3. An S reel base 4 and a T reel base 5, which are rotatably provided on the subchassis 3, are engaged with the reels (not shown) in the cassette 1.

An idler gear 7 is axially supported on an idler 6. The idler 6 is provided rotatably with respect to the center gear shaft 9, which is provided on a main chassis 8. The center gear 10 is provided rotatably with respect to the center gear shaft 9. The idler gear 7 is rotated by the center gear 10 to be engaged with gears around the S reel base 4 and the T reel base 5, thereby rotating the gears around the S reel base 4 and the T reel base 5. A memory-in-cassette reading switch (hereinafter, referred to simply as the "MIC-SW") 11 is provided in the subchassis 3.

Figure 2:
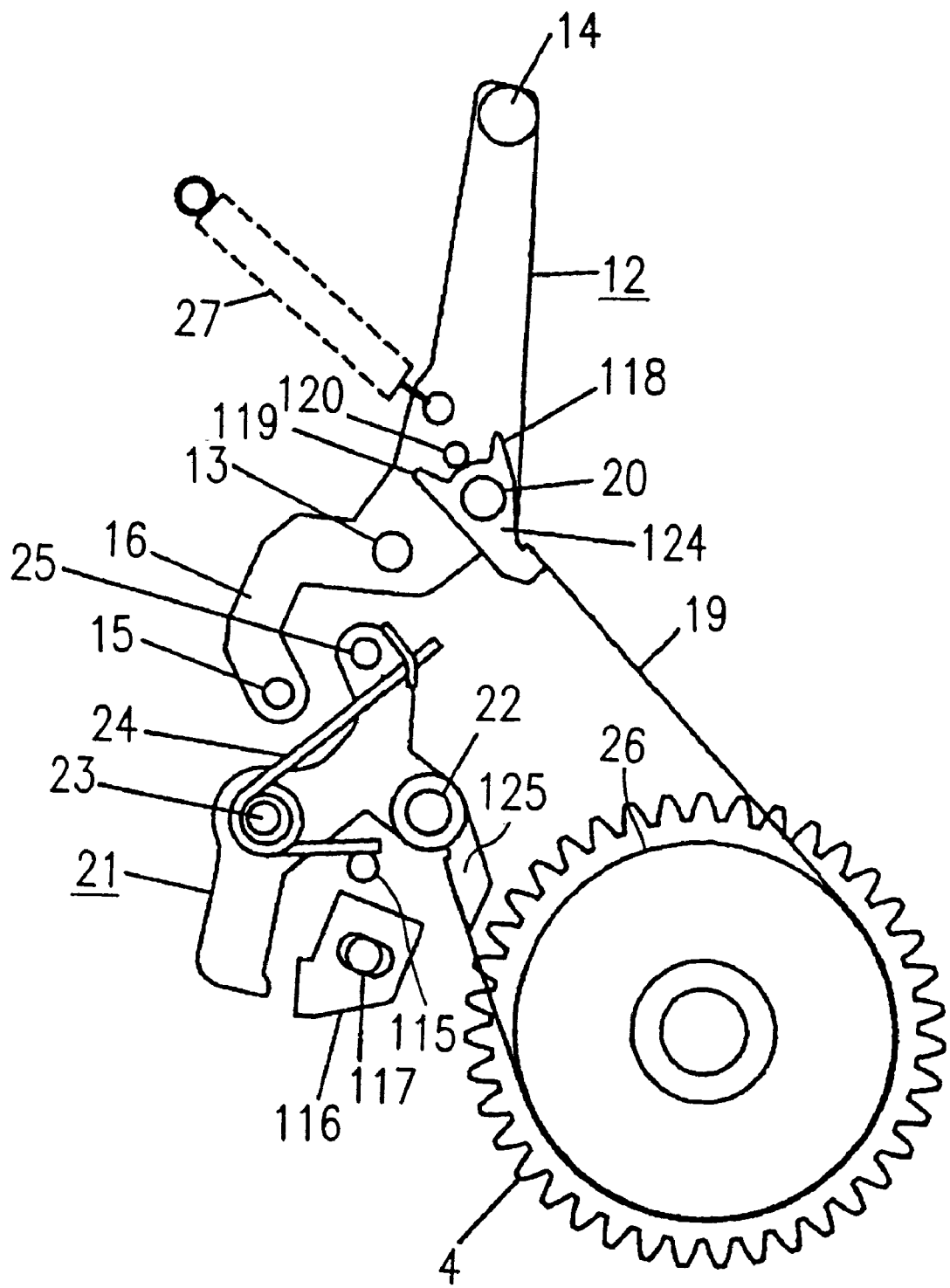
FIG. 2 is a detailed plan view illustrating a tension arm and peripheral elements of the magnetic recording/reproduction apparatus.

FIG. 2 illustrates in detail a tension arm 12 and the peripheral elements thereof.

Referring to FIGS. 1 and 2, the tension arm 12 is provided in the subchassis 3 to be rotatable about a tension arm shaft 13. A tension post 14 is provided on one end of the tension arm 12. A tension arm regulating pin 15 provided on an end 16 of the tension arm 12 passes through a hole 17 provided in the subchassis 3 to be engaged with a tension plate 16 (FIG. 3) on the main chassis 8 for regulating the movement of the tension arm 12. The tension plate 18 is not shown in FIG. 1.

An end 124 of a tension band 19 is axially supported about a shaft 20 on the tension arm 12. The other end 125 of the tension band 19 is axially supported about a shaft 22 on a tension band regulating arm 21. The tension band regulating arm 21 is axially supported about a shaft 23 on the subchassis 3, and is biased in the counterclockwise direction by a twisted coil spring 24. A spring peg 115 is provided on the subchassis 3 for the twisted coil spring 24. A tension arm stop plate 116 is fixed by a screw (not shown) on the subchassis 3 in a predetermined adjusted position 117. The movement (and thus the position) of the tension band regulating arm 21 is regulated by contacting the tension arm stop plate 116.

A pin 25 is provided in the tension band regulating arm 21. The pin 25 passes through the hole 17 in the subchassis 3 to be engaged with the tension plate 18 for regulating the movement of the tension band regulating arm 21. The tension band 19 is wound around a cylindrical portion 26 of the S reel base 4. The tension arm 12 is biased in the counterclockwise direction by a tension spring 27. An end of the tension spring 27 is hooked around a spring peg provided in the subchassis 3.

In the present embodiment of the invention, all the tension springs are shown only by their profiles in a broken line for the sake of simplicity. A protrusion A 118 and a protrusion B 119 are provided at the end 124 of the tension band 19. A band regulating protrusion 120 provided in the tension arm 12 regulates the movement of the tension band 19 by contacting and pushing back the protrusion A 118 and the protrusion B 119 so as to prevent the tension band 19 from slacking and thus dropping off the S reel base 4.

In FIG. 1, a T4 arm 28 is axially supported about a shaft 29 on the subchassis 3. A T4 post 30 is provided on an end of the T4 arm 28, and a T4 arm regulating pin 31 is provided on the other end thereof. The T4 arm 28 is biased in the counterclockwise direction by a spring (not shown).

A cam A plate 32 and a cam B plate 33 are attached to the subchassis 3 by means of pins 34 and 35 so as to be movable in the left/right direction (in the plane of FIG. 1). The cam A plate 32 and the cam B plate 33 are fixed to the subchassis 3 by means of screws (not shown) after their positions are adjusted.

The subchassis 3 includes four elongated holes 36 which are engaged with four axes 37 provided on the main chassis 8, thereby supporting the subchassis 3 so that the subchassis 3 can move in the forward/backward direction (in the plane of the figure) along the four elongated holes 36.

The tape 2 is wound around a cylinder 38 with a rotary magnetic head provided on the main chassis 8, whereby the apparatus is ready to record/reproduce signals (data) to/from the tape 2.

Pins 41A, 41B and 41C, 41D provided in an S boat 39 and a T boat 40, respectively, are engaged with elongated holes 43 of a rail 42, so that the S boat 39 and the T boat 40 move along the elongated holes 43. An S1 post 45 and an S2 post 44 are provided on the S boat 39, and a T1 post 46 and a T2 post 47 are provided on the T boat 40. The tape 2 is wound around the cylinder 38 along with the movement of the S boat 39 and the T boat 40.

A rail portion 48 is provided on the main chassis 8, and an S3 post 49 is also provided on the main chassis 8. A T3 post 51 is provided in a capstan housing 52 holding a capstan 50.

A pinch arm 53 is axially supported about a pivotal shaft 54 on the main chassis 8. A pinch roller 55 is rotatably provided on an end of the pinch arm 53. A pinch press arm 56 is coaxial with the pivotal shaft 54 of the pinch arm 53, and is biased by a twisted coil spring 57 together with the pinch arm 53. A tension spring 58 is placed under tension between the pinch arm 53 and the subchassis 3 for biasing the pinch arm 53 in the counterclockwise direction. A protrusion 59 of the pinch arm 53 contacts a wall portion 60 of the subchassis 3, thereby driving the pinch arm 53 along with the movement of the subchassis 3.

An exemplary structure of the main chassis 8 will be described with reference to FIG. 3.

Figure 3:
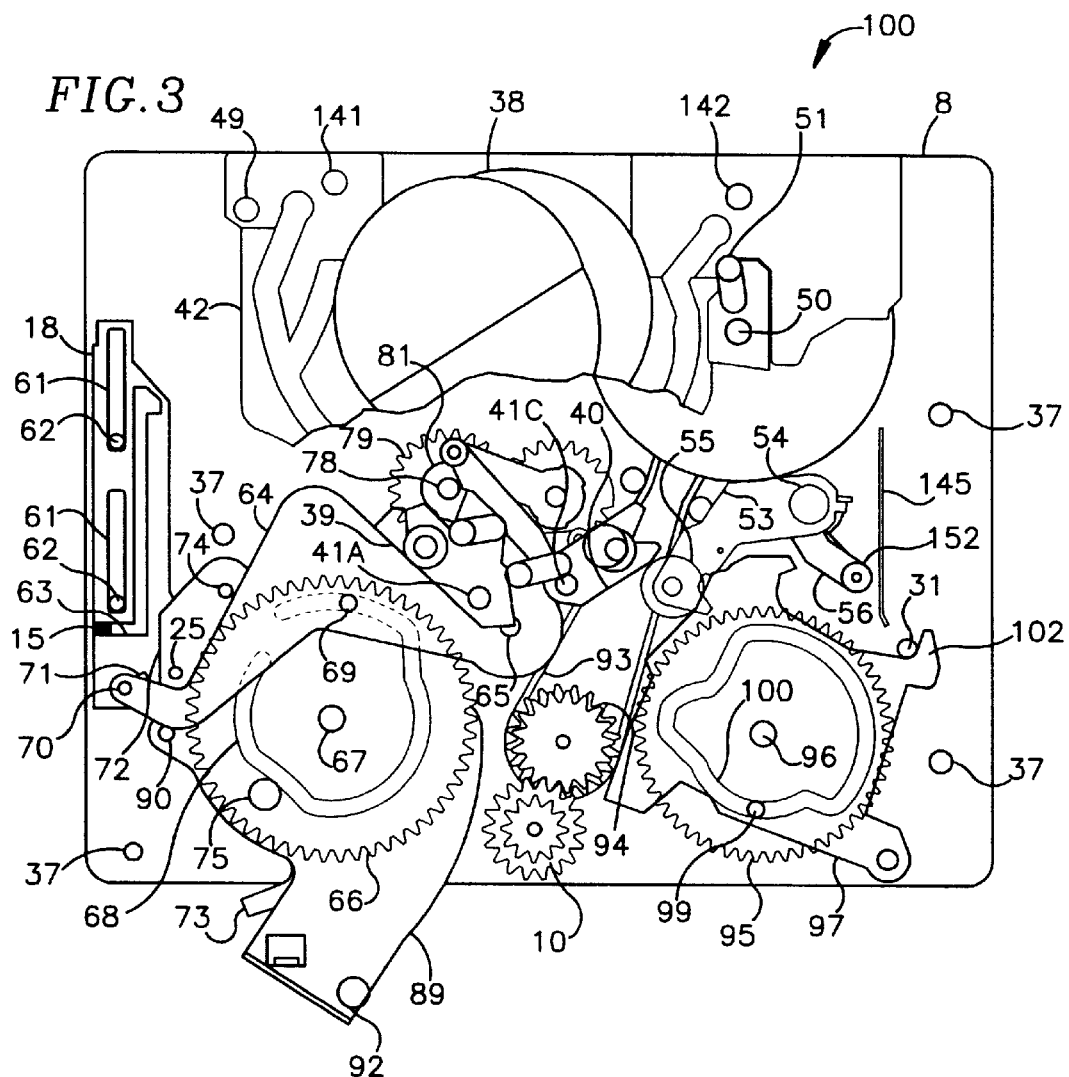
FIG. 3 is a plan view illustrating the magnetic recording/reproduction apparatus in the unloaded mode with a sub-chassis being removed.
Figure 4:
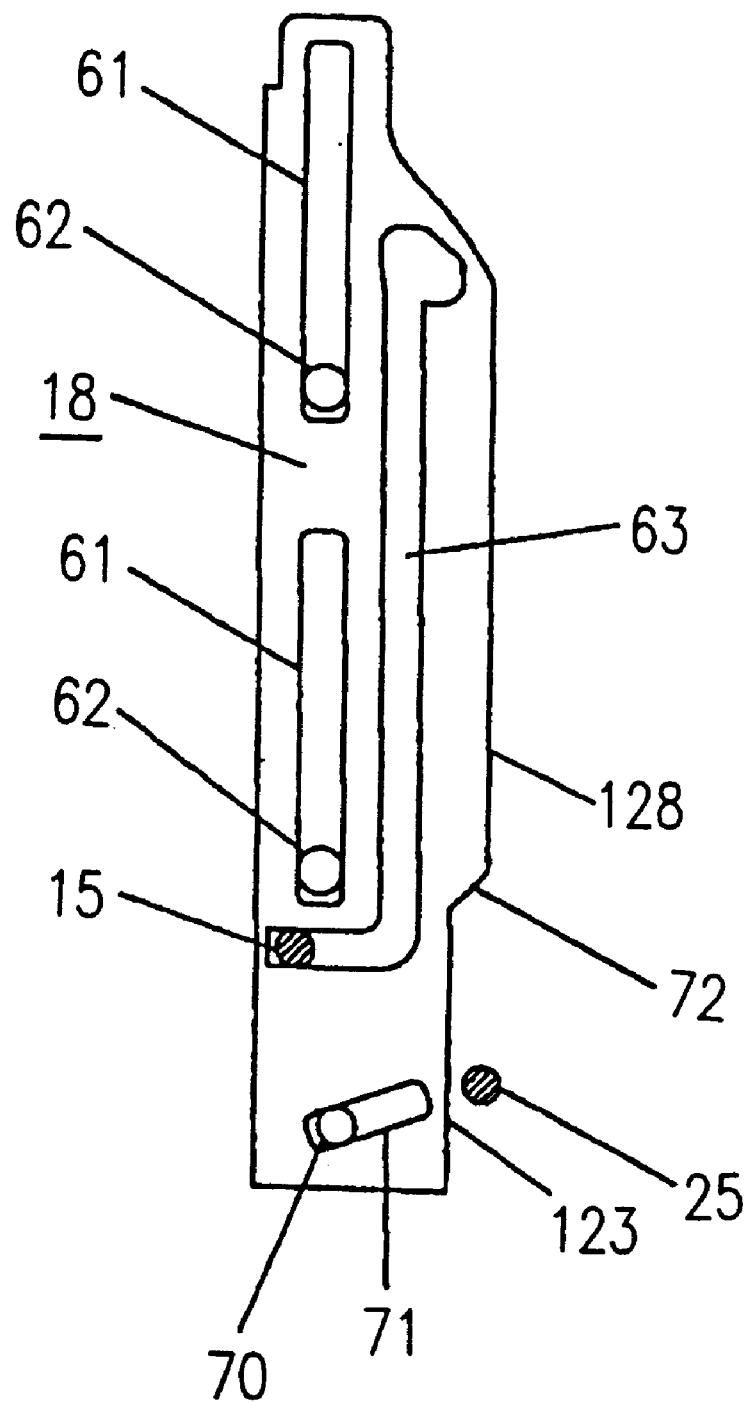
FIG. 4 is a detailed plan view illustrating a tension plate and peripheral elements of the magnetic recording/reproduction apparatus in the unloaded mode.

FIG. 3 is a plan view similar to FIG. 1 illustrating the magnetic recording/reproduction apparatus in the unloaded mode according to the present embodiment of the invention, but with the subchassis 3 being removed. FIG. 4 illustrates in detail the tension plate 18.

Referring to FIGS. 3 and 4, two elongated holes 61 provided in the tension plate 18 are engaged with two guide pins 62 provided on the main chassis 8, and the tension plate 18 is guided by the guide pins 62 in the forward/backward direction.

A cam groove 63 provided in the tension plate 18 is engaged with the tension arm regulating pin 15 illustrated in FIG. 1. A tension plate drive arm 64 is axially supported about a shaft 65 on the main chassis 8. A can gear 66 is axially supported about a shaft 67 on the main chassis 8. A cam groove 68 provided on the cam gear 66 is engaged with a cam follower pin 69 provided on the tension plate drive arm 64. A pin 70 provided on the tension plate drive arm 64 is engaged with a cam groove 71 provided in the tension plate 18. The pin 25 provided on the tension band regulating arm 21 in FIG. 1 contacts a right edge cam 72 of the tension plate 18.

Referring to FIGS. 1, 3 and 4, the tension plate drive arm 64 is driven by the cam groove 68 of the cam gear 66, and the tension plate 18 is driven by the pin 70 on the tension plate drive arm 64.

The tension arm 12 and the tension band regulating arm 21 are driven and regulated respectively by the cam groove 63 and the right edge cam 72 provided in the tension plate 18.

Figure 5:
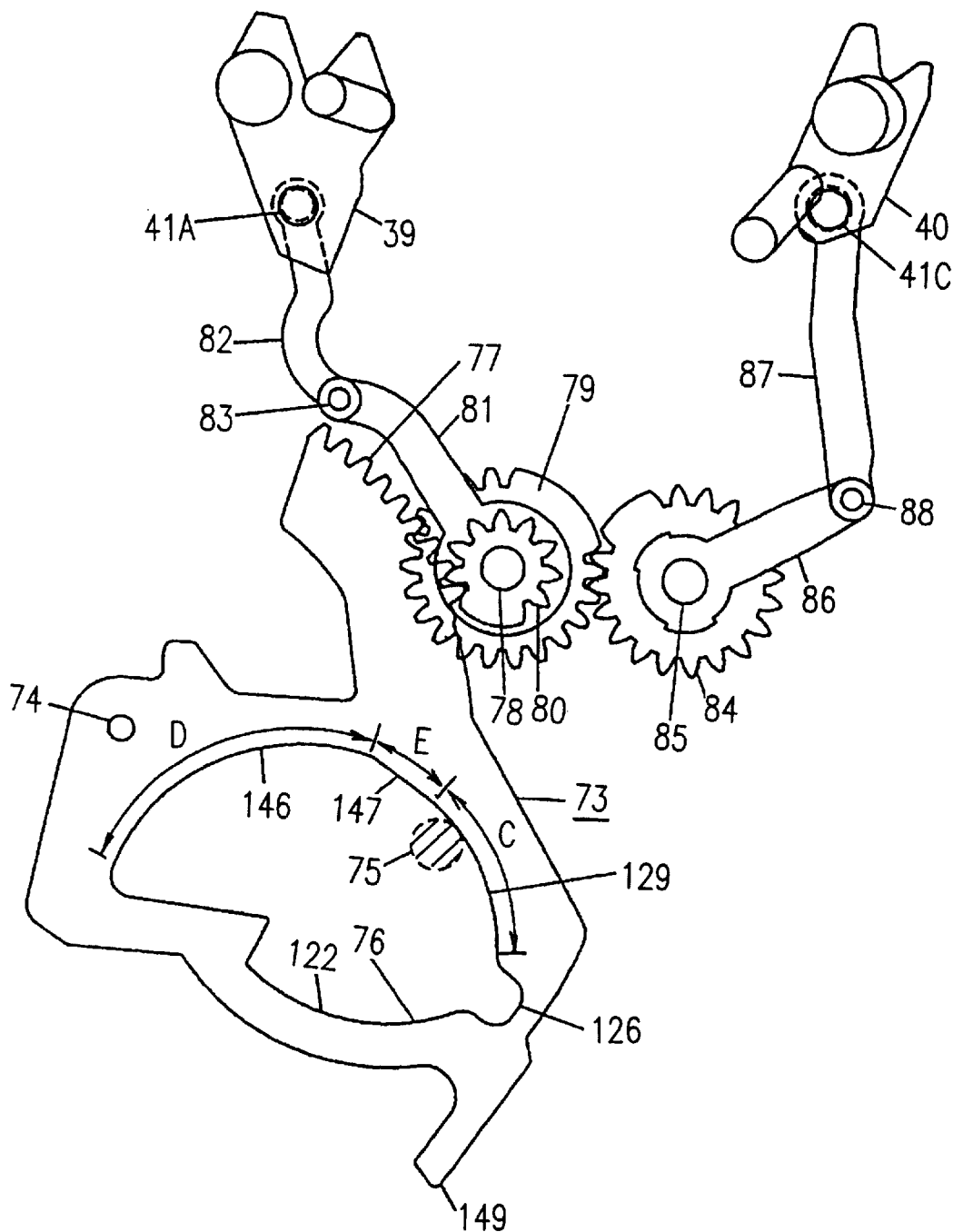
FIG. 5 illustrates a structure for driving an S boat and a T boat provided on a main chassis of the magnetic recording/reproduction apparatus.

FIG. 5 illustrates a structure for driving the S boat 39 and the T boat 40 provided on the main chassis 8.

Referring to FIGS. 3 and 5, a boat drive arm 73 is axially supported about a shaft 74 on the main chassis 8. A drive pin 75 provided on the cam gear 66 contacts an inner cam 76 provided in the boat drive arm 73. The boat drive arm 73 is driven by rotation of the cam gear 66.

A gear portion 77 provided in the boat drive arm 73 is engaged with a small gear portion 80, which is provided integrally with an S load gear 79, which is axially supported about a shaft 78 on the main chassis 8.

An S load arm 81 is supported coaxially with the S load gear 79. An S load link 82 is rotatably attached to the S load arm 81 and the S boat 39 via a shaft 83 and the pin 41A, respectively.

A T load gear 84 is axially supported about a shaft 85 on the main chassis 8, and is engaged with the S load gear 79. A T load arm 86 is supported coaxially with the T load gear 84. A T load link 87 is rotatably attached to the T load arm 86 and the T boat 40 via a shaft 88 and the pin 41C, respectively.

In a normal state, the S load arm 81 and the S load gear 79 are held together by a twisted coil spring (not shown) and rotate about the shaft 78. When the S load gear 79 is rotated in the clockwise direction, the S load gear 79 is biased in the counterclockwise direction by the twisted coil spring (not shown). Similarly, in a normal state, the T load arm 86 and the T load gear 84 are held together by a twisted coil spring (not shown) and rotate about the shaft 85. When the T load gear 84 is rotated in the counterclockwise direction with the T load arm 86 being stopped, the T load gear 84 is biased In the clockwise direction by the twisted coil spring (not shown).

The S load gear 79 and the T load gear 84 are driven by pivotal movement of the boat drive arm 73, thereby moving the S boat 39 and the T boat 40 along the rail 42 via the S load link 82 and the T load link 87, respectively.

Figure 6:
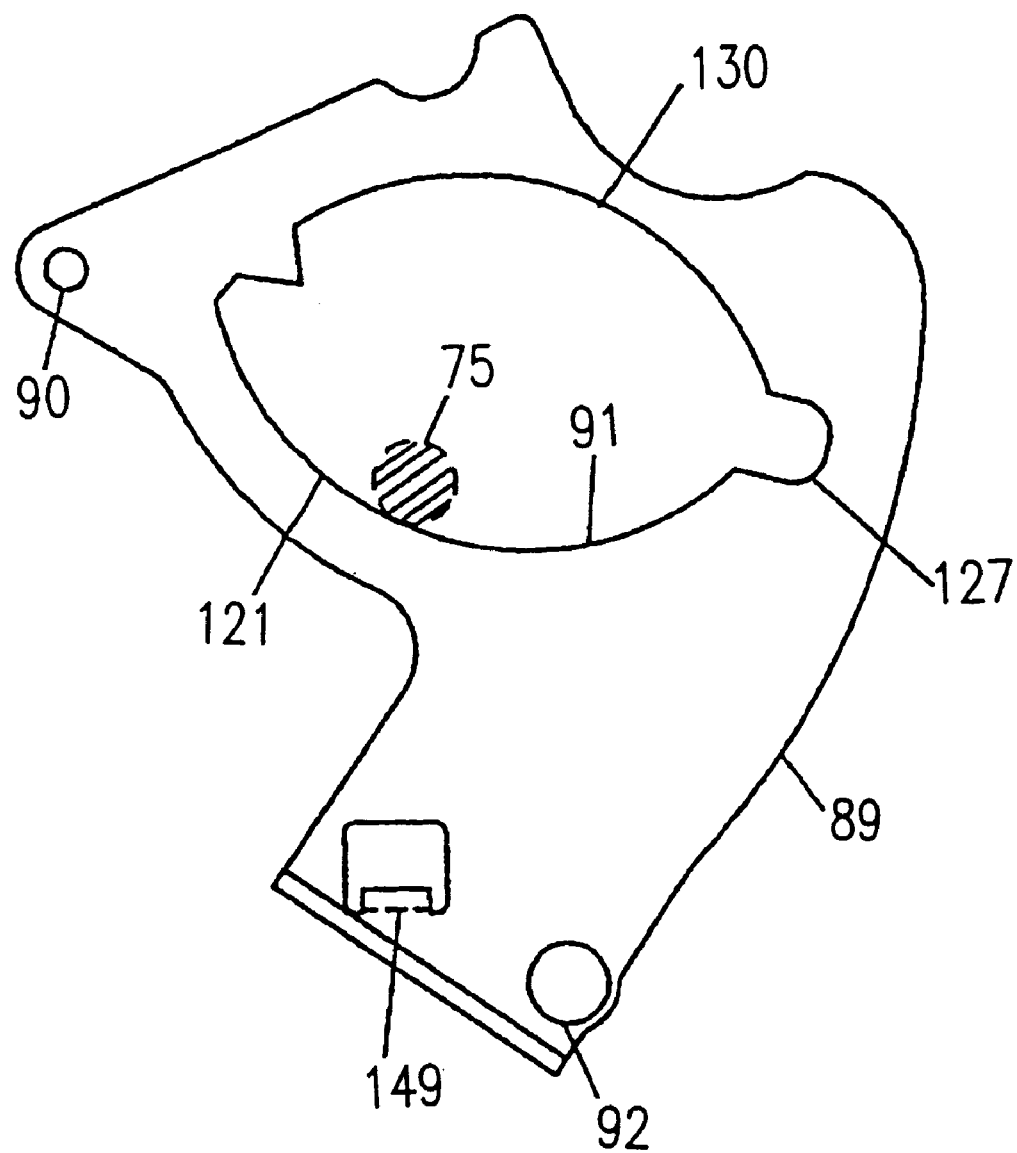
FIG. 6 illustrates a subchassis drive arm of the magnetic recording/reproduction apparatus.

FIG. 6 illustrates a subchassis drive arm 89. Referring to FIGS. 1, 3 and 6, the subchassis drive arm 89 is axially supported about a shaft 90 on the main chassis 8. As in the boat drive arm 73, an inner cam 91 provided in the subchassis drive arm 89 is driven by the drive pin 75 provided on the cam gear 66.

A guide pin 92 provided on the subchassis drive arm 89 contacts the cam A plate 32 and the cam B plate 33 via a hole 108 provided in the subchassis 3 as illustrated in FIG. 1. The subchassis drive arm 89 is driven by the cam gear 66, and the subchassis 3 is driven by the subchassis drive arm 89 via the cam A plate 32 and the cam B plate 33.

The position of the subchassis 3 with respect to the main chassis 8 can be adjusted by adjusting the positions of the cam A plate 32 and the cam B plate 33 in the left/right direction.

Referring to FIG. 3, a timing belt 93 transfers the rotation of the capstan 50 to a two-stage gear 94 axially supported on the main chassis B. The two-stage gear 94 is meshed with the center gear 10, whereby the rotation of the capstan 50 is transferred to the S reel base 4 and the T reel base 5 via the timing belt 93, the two-stage gear 94, the center gear 10 and the idler gear 7.

Figure 7:
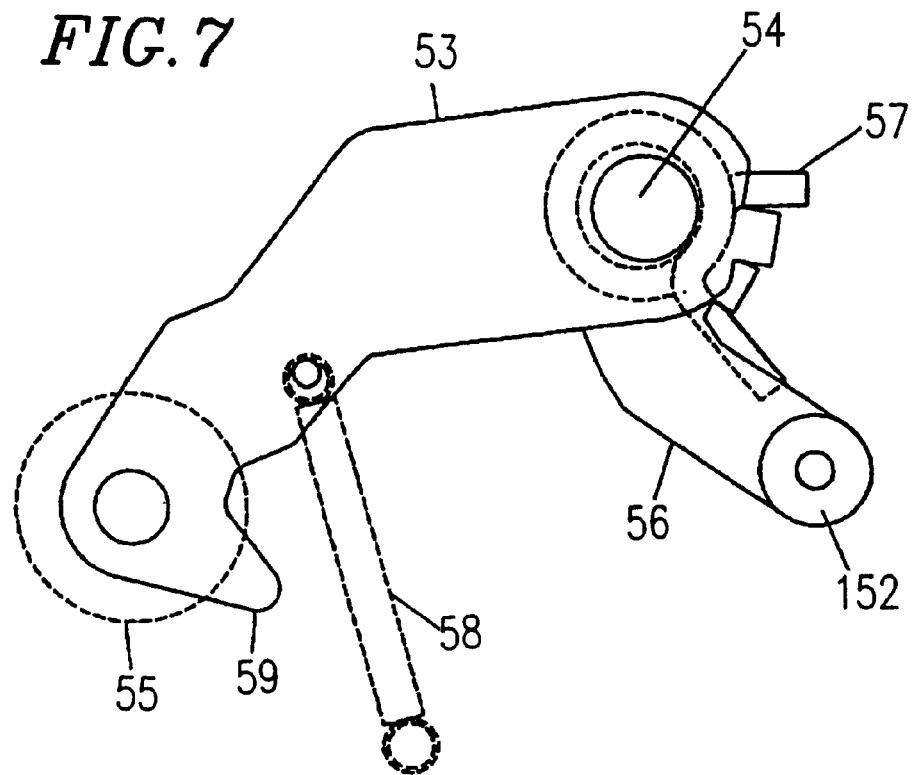
FIG. 7 illustrates a pinch arm and peripheral elements of the magnetic recording/reproduction apparatus.
Figure 8:
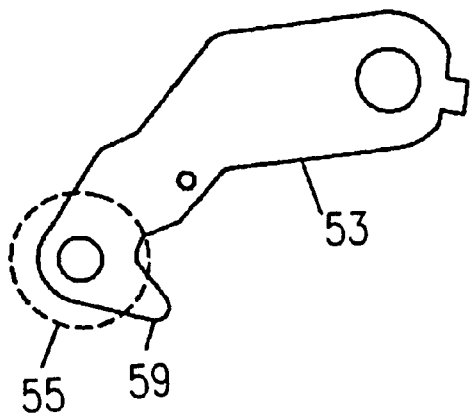
FIG. 8 illustrates the pinch arm of the magnetic recording/reproduction apparatus.
Figure 9:
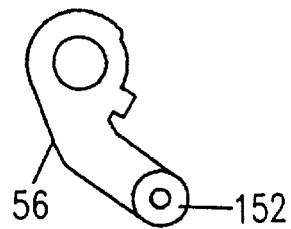
FIG. 9 illustrates a pinch press arm of the magnetic recording/reproduction apparatus.
Figure 10:
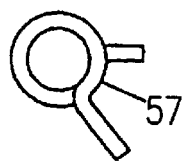
FIG. 10 illustrates a twisted coil spring of the magnetic recording/reproduction apparatus.

FIGS. 7 and 8 illustrate an exemplary structure of the pinch arm 53. FIG. 9 illustrates an exemplary structure of the pinch press arm 56, and FIG. 10 illustrates an exemplary structure of the twisted coil spring 57.

In FIGS. 7 and 8, the pinch roller 55 is illustrated only by its profile in a broken line.

Referring to FIG. 7, in a normal state (e.g., one of various states other than a state where the S boat 39 is in contact with a boat stopper 141), the pinch arm 53 and the pinch press arm 56 are held together by the twisted coil spring 57 and rotate about the pivotal shaft 54. When the pinch press arm 56 is rotated in the clockwise direction while the pinch roller 55 is in contact with the capstan 50 (whereby its pivotal movement is stopped), the pinch roller 55 is pressed against the capstan 50 by virtue of a reacting force from the twisted coil spring 57. A roller 152 is axially supported on the pinch press arm 56.

Referring to FIG. 3, a pinch cam gear 95 is axially supported about a shaft 96 on the main chassis 8. A pinch drive arm 97 is axially supported on the main chassis 8. A cam pin 99 provided on the pinch drive arm 97 is engaged with a cam groove 100 provided in the pinch cam gear 95, whereby the pinch drive arm 97 is driven by the pinch cam gear 95.

Referring to FIGS. 1 and 3, the T4 arm regulating pin 31 passes through a hole 101 provided in the subchassis 3 so as to contact a protrusion 102 provided on the pinch drive arm 97. The T4 arm 28 is driven by the rotation of the pinch drive arm 97.

Figure 11:
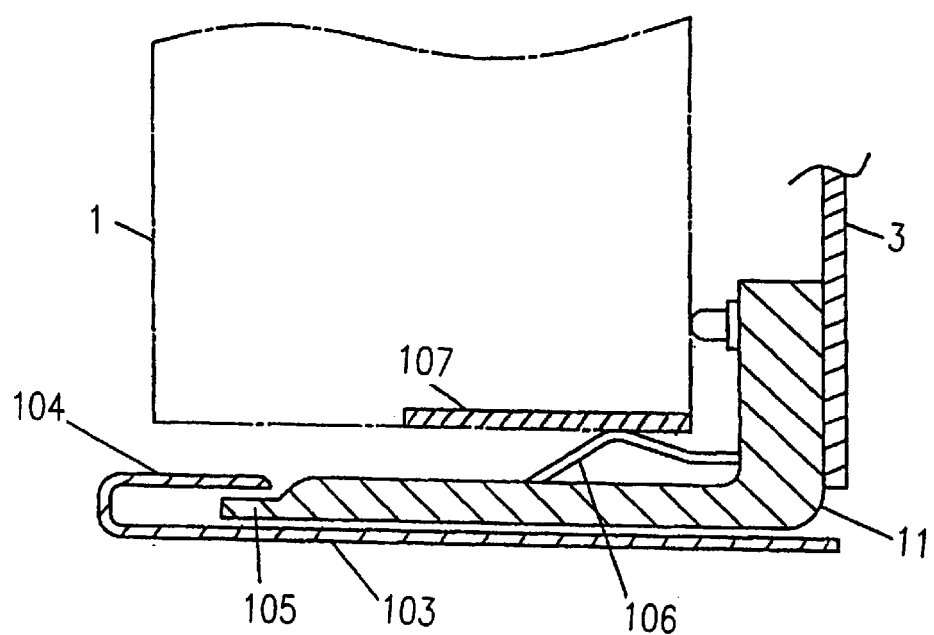
FIG. 11 is a cross-sectional view of an MIC-SW of the magnetic recording/reproduction apparatus taken along A—A line in FIG. 1.

FIG. 11 is a cross-sectional view taken along a chain line A—A in FIG. 1, illustrating the MIC-SW 11.

Referring to FIGS. 1 and 11, the MIC-SW 11 is fixed by a screw (not shown) on the subchassis 3. A subchassis reinforcing plate 103 is fixed on the subchassis 3 by means of a screw (not shown). A folded upper end portion 104 of the subchassis reinforcing plate 103, shown on the left side of FIG. 11, is engaged with an upper end portion 105 of the MIC-SW 11, thereby increasing the mechanical strength of the MIC-SW 11.

A contact terminal 106 provided on the MIC-SW 11 contacts a memory-in-cassette 107 provided in the cassette so as to input/output a signal. As the contact terminal 106 is pressed by the cassette 2, the MIC-SW 11 is subject to the reacting force. The main body of the MIC-SW 11 is typically made of a plastic, or the like, and therefore the MIC-SW is subject to creep deformation. According to the present invention, however, the MIC-SW 11 can be reinforced by the subchassis reinforcing plate 103, whereby the MIC-SW 11 can be made thin, thereby reducing the size of the apparatus.

Figure 12:
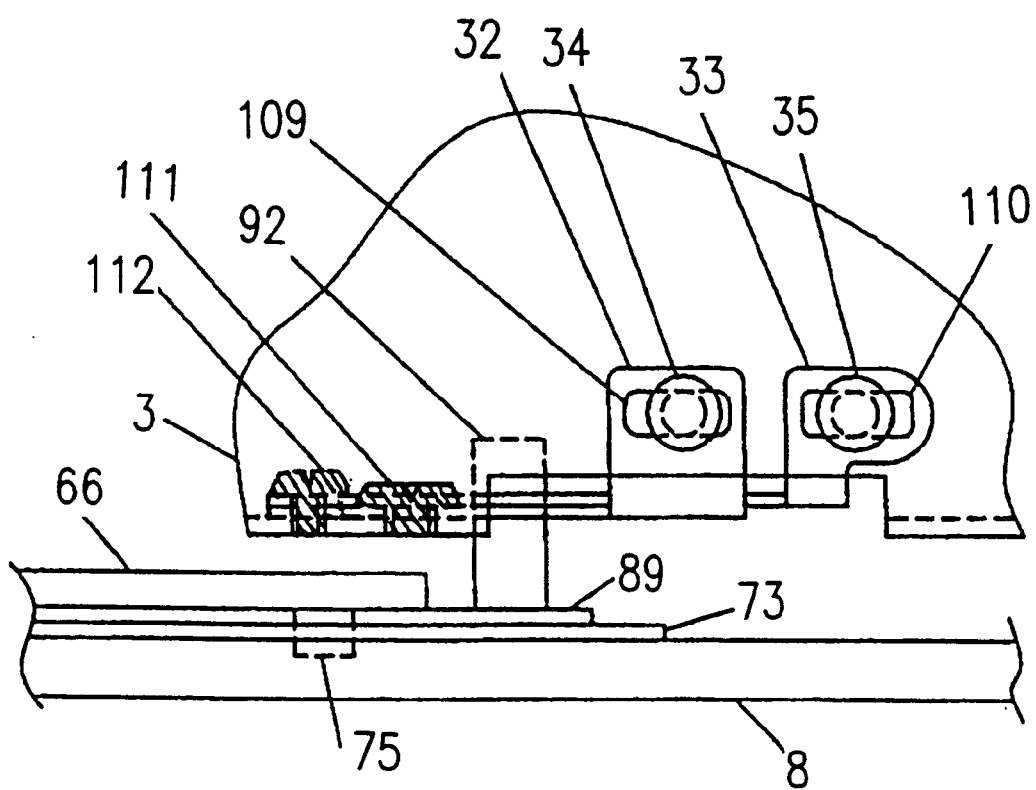
FIG. 12 is a cross-sectional view of the magnetic recording/reproduction apparatus taken along the direction indicated by an arrow B in FIG. 1.

FIG. 12 illustrates the magnetic recording/reproduction apparatus of FIG. 1 as viewed from the direction B.

Referring to FIGS. 1 and 12, the boat drive arm 73 and the subchassis drive arm 89 are driven by the drive pin 75 provided on the cam gear 66. Elongated holes 109 and 110 are provided in the cam A plate 32 and the cam B plate 33, respectively.

The cam A plate 32 and the cam B plate 33 are held on the subchassis 3 so as to be movable in the left/right direction via the elongated holes 109 and 110. The cam A plate 32 and the cam B plate 33 are fixed to the subchassis 3 by screws 111 and 112.

In positions 113 and 114 in FIG. 1, the positions of the cam A plate 32 and the cam B plate 33 are adjusted so as to guide the guide pin 92 in the left/right direction with respect to the subchassis 3, after which the cam A plate 32 and the cam B plate 33 are fixed by means of the screws 111 and 112.

FIGS. 13 to 17 are plan views illustrating a sequence of operation modes from the unloaded mode to the tape recording/reproduction mode according to the present embodiment of the invention.

Figure 13:
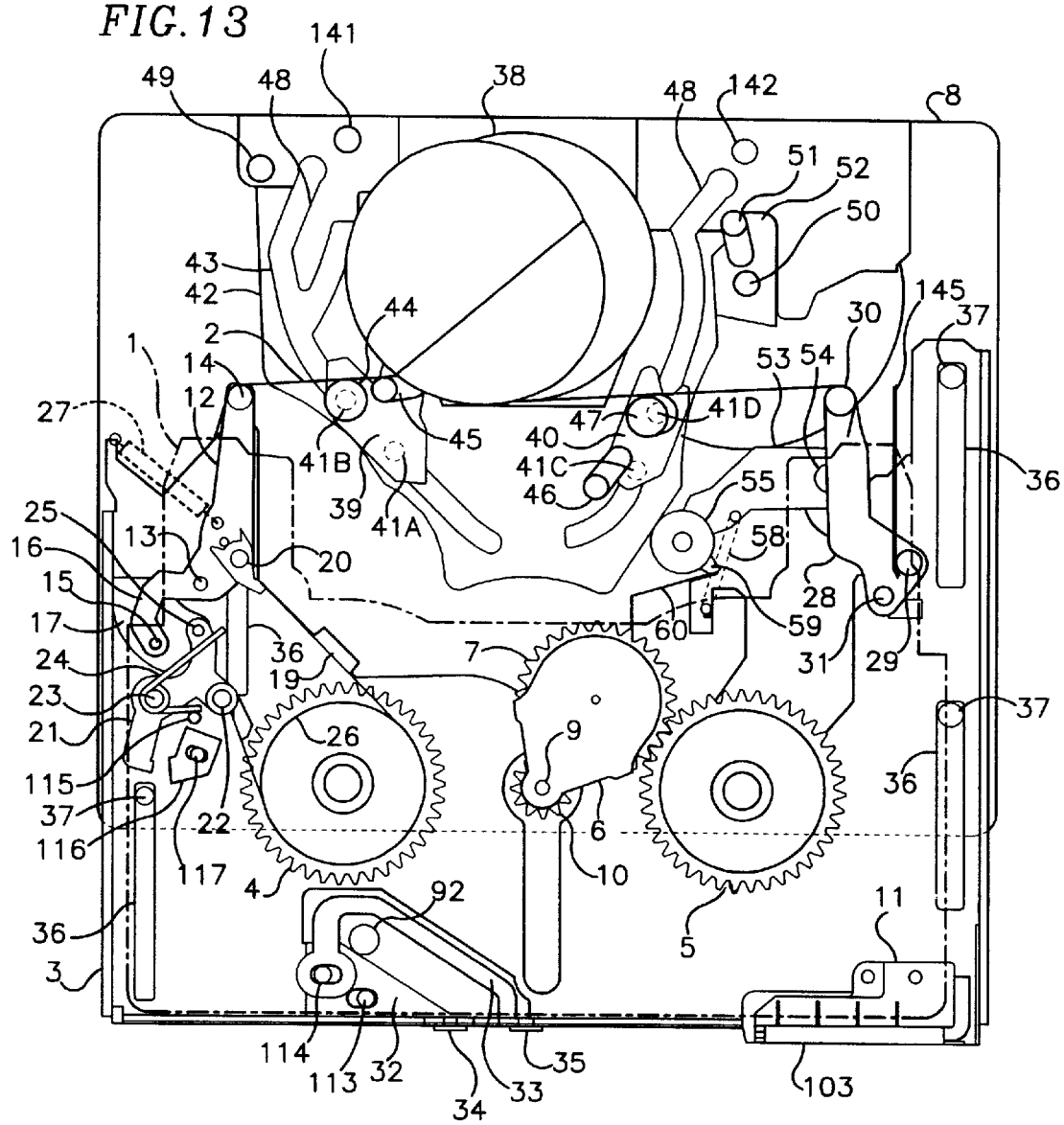
FIG. 13 is a plan view of the magnetic recording/reproduction apparatus in a loaded mode 1 where a tension post and a T4 post are pulled out.
Figure 14:
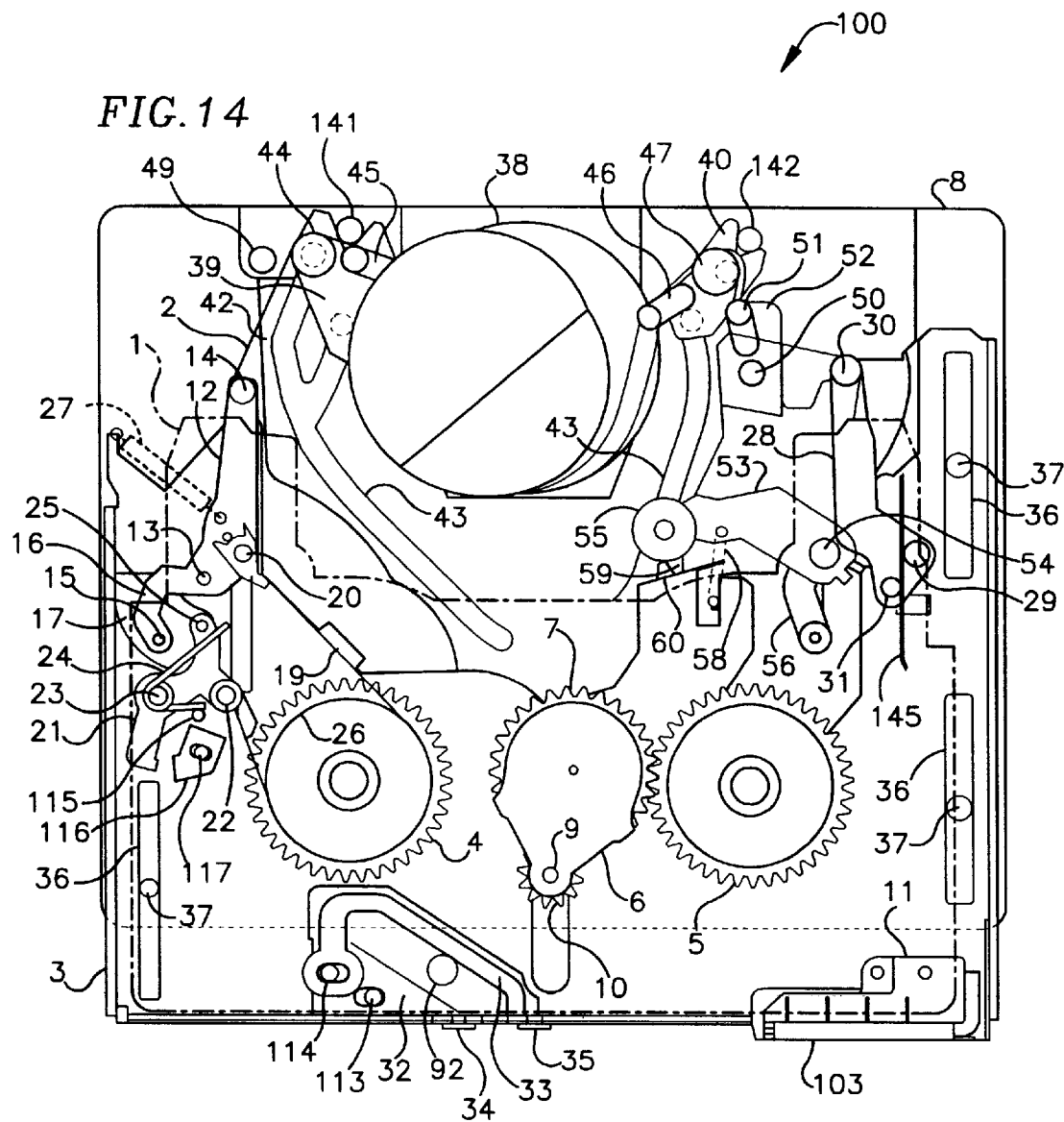
FIG. 14 is a plan view of the magnetic recording/reproduction apparatus in a loaded mode 2 where the subchassis has moved one half of its total stroke.
Figure 15:
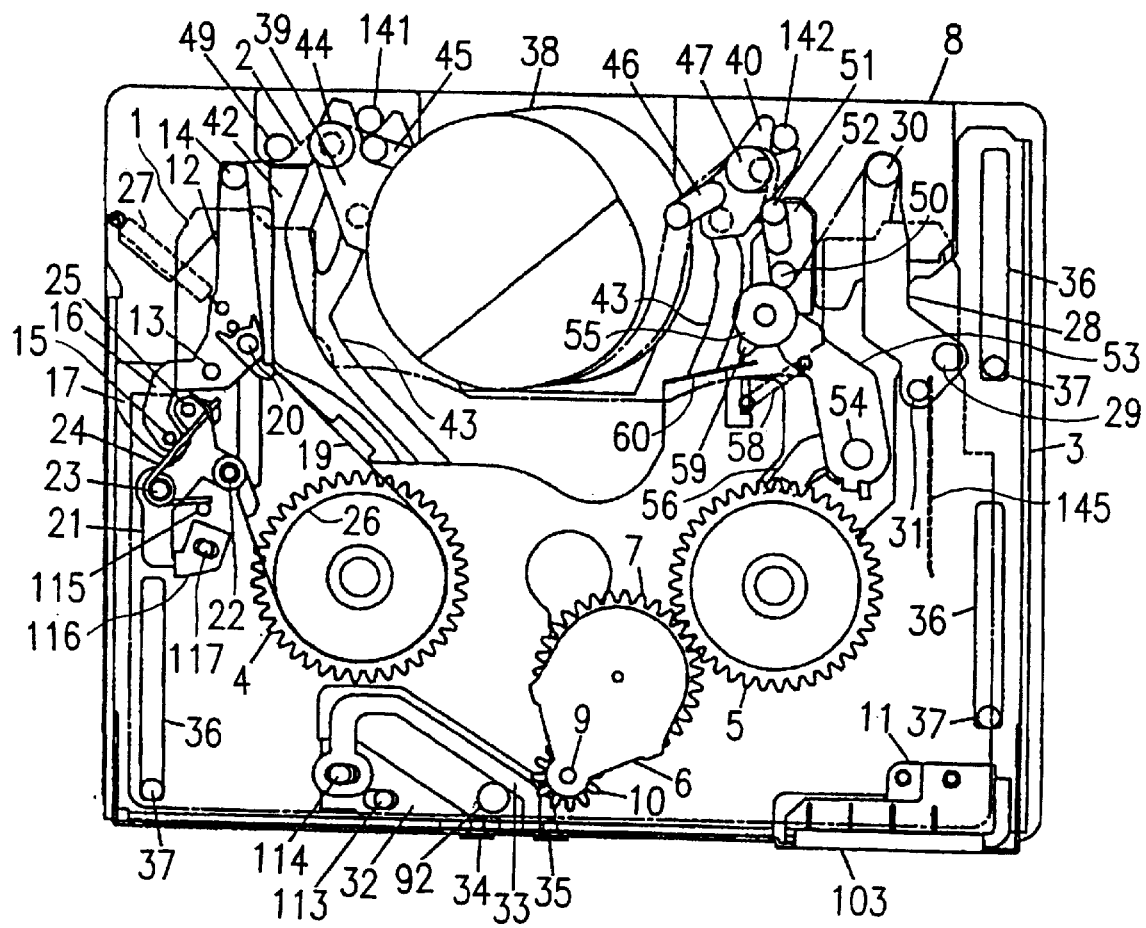
FIG. 15 is a plan view of the magnetic recording/reproduction apparatus in a play mode where the apparatus is ready to perform functions such as recording, reproduction and fast-forward of a tape.

FIG. 13 illustrates a mode where the tension post 14 and the T4 post 30 have been pulled out (hereinafter, referred to as the "loaded mode 1"). FIG. 14 illustrates a mode where the subchassis 3 has moved one half of its total stroke (hereinafter, referred to as the "loaded mode 2"). FIG. 15 illustrates a mode where the subchassis 3 has moved completely while the tape loading (i.e., winding of the tape 2 around the cylinder 38) has been complete (hereinafter, referred to as the "play mode") In the play mode, the tape can be driven in the forward direction (from the S reel base 4 to the T reel base 5), thereby performing functions such as recording, reproduction and fast-forward of the tape.

Figure 16:
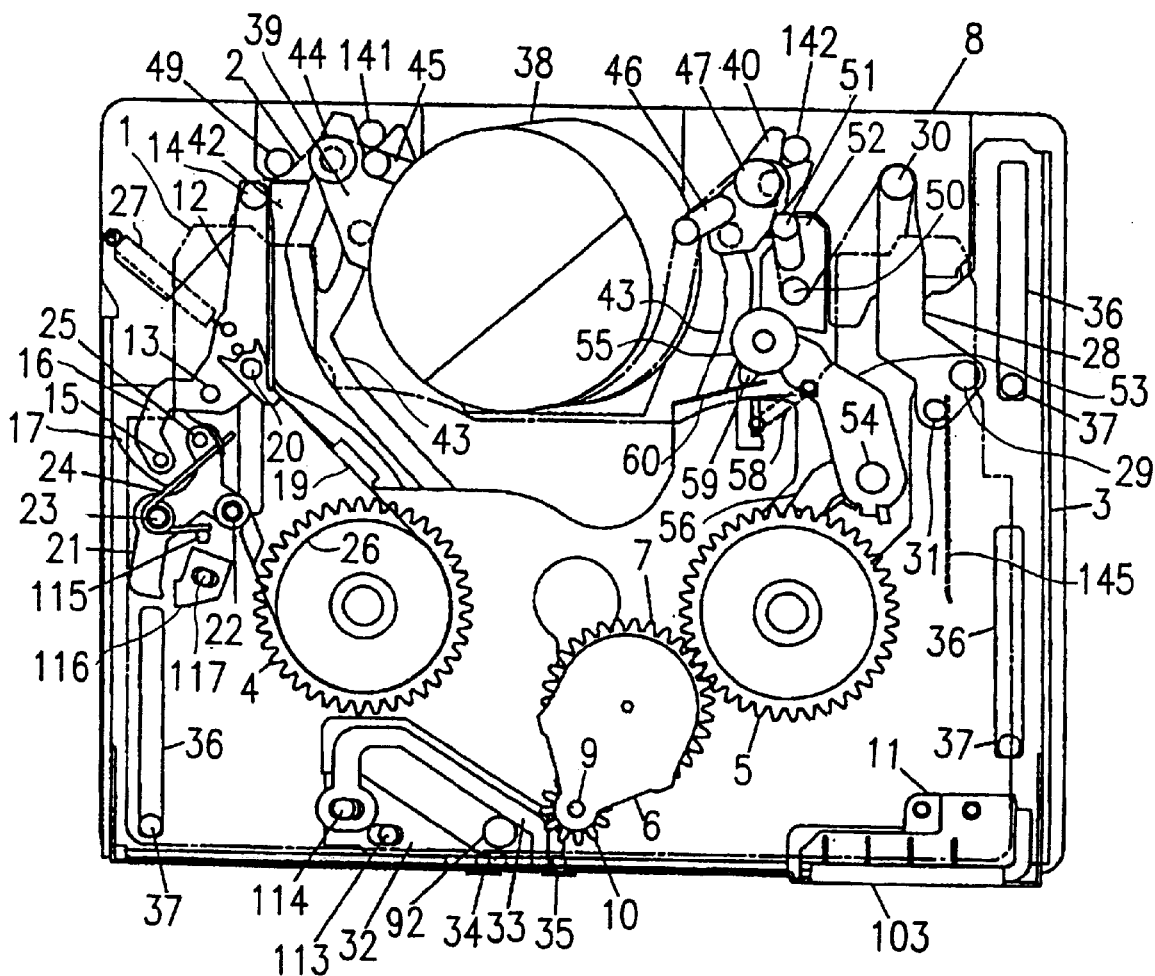
FIG. 16 is a plan view illustrating the magnetic recording/reproduction apparatus in a stop mode where the tape is not being driven.

FIG. 16 illustrates a mode where the tape is not driven (hereinafter, referred to as the "stop mode").

Figure 17:
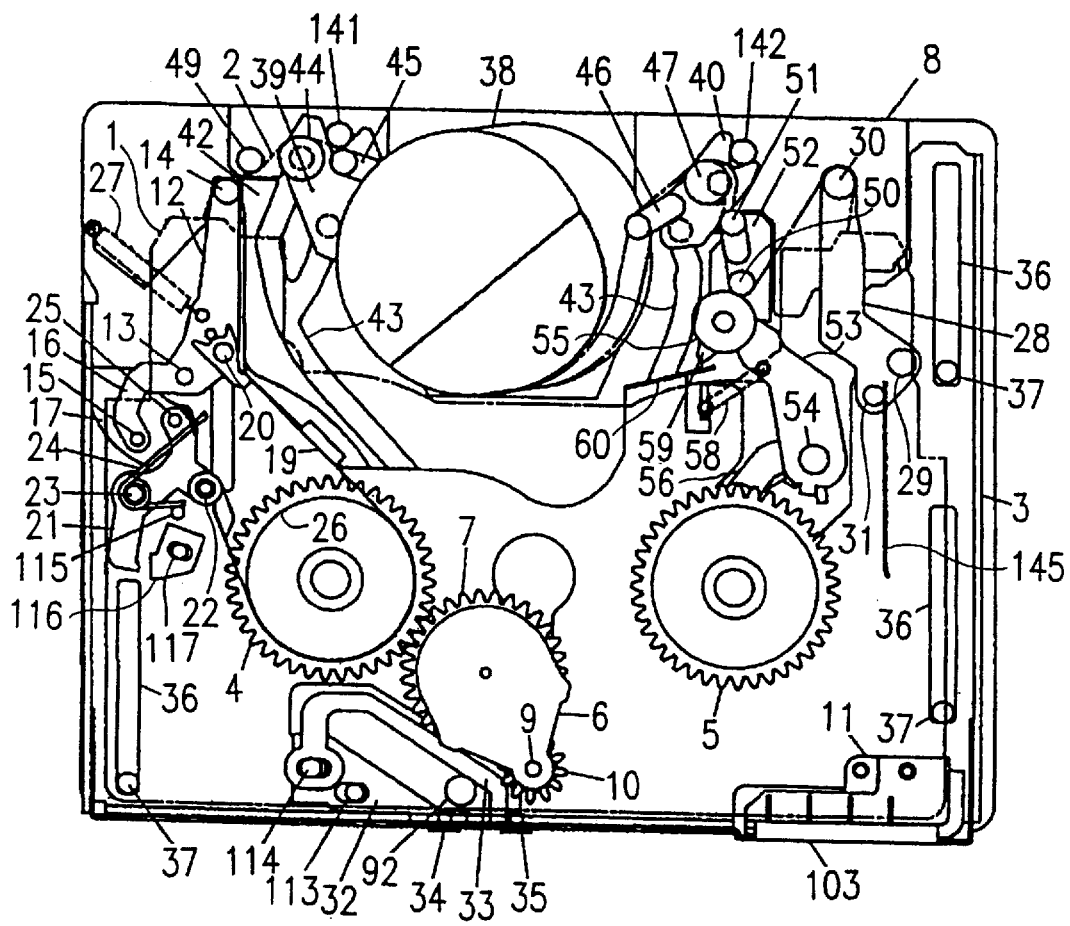
FIG. 17 is a plan view illustrating the magnetic recording/reproduction apparatus in a reverse mode where the apparatus is ready to perform functions such as reverse reproduction and rewinding of the tape.

FIG. 17 illustrates a mode where the tape can be driven in the reverse direction (from the T reel base 5 to the S reel base 4), thereby performing other functions such as reverse reproduction and rewinding of the tape (hereinafter, referred to as the "reverse mode").

Elements in FIGS. 13 to 17 having like reference numerals to those shown in FIG. 1 will not be further described.

An exemplary structure of the main chassis 8 will now be described with reference to FIGS. 18 and 19.

Figure 18:
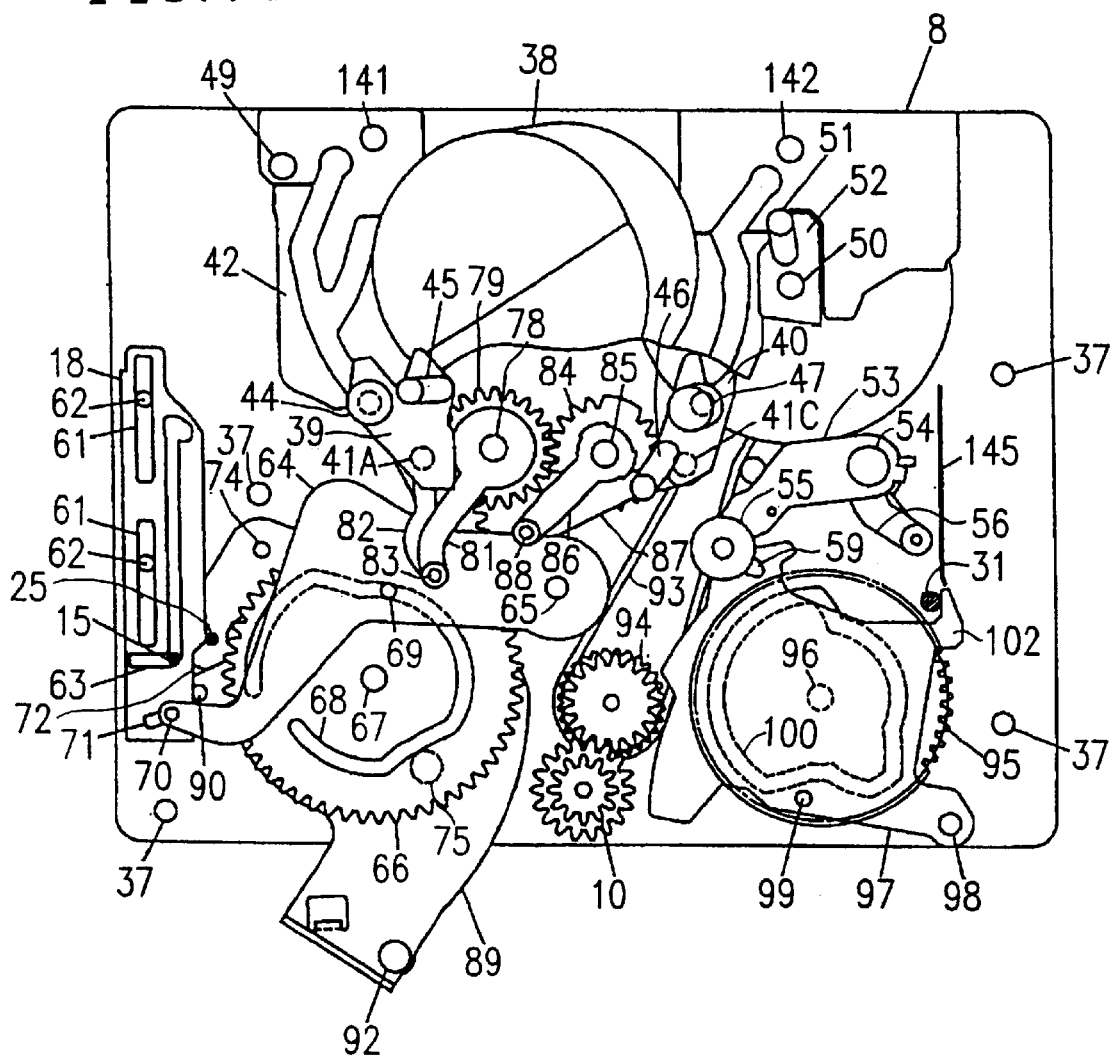
FIG. 18 is a plan view illustrating the magnetic recording/reproduction apparatus in the loaded mode 1 with the subchassis being removed.
Figure 19:
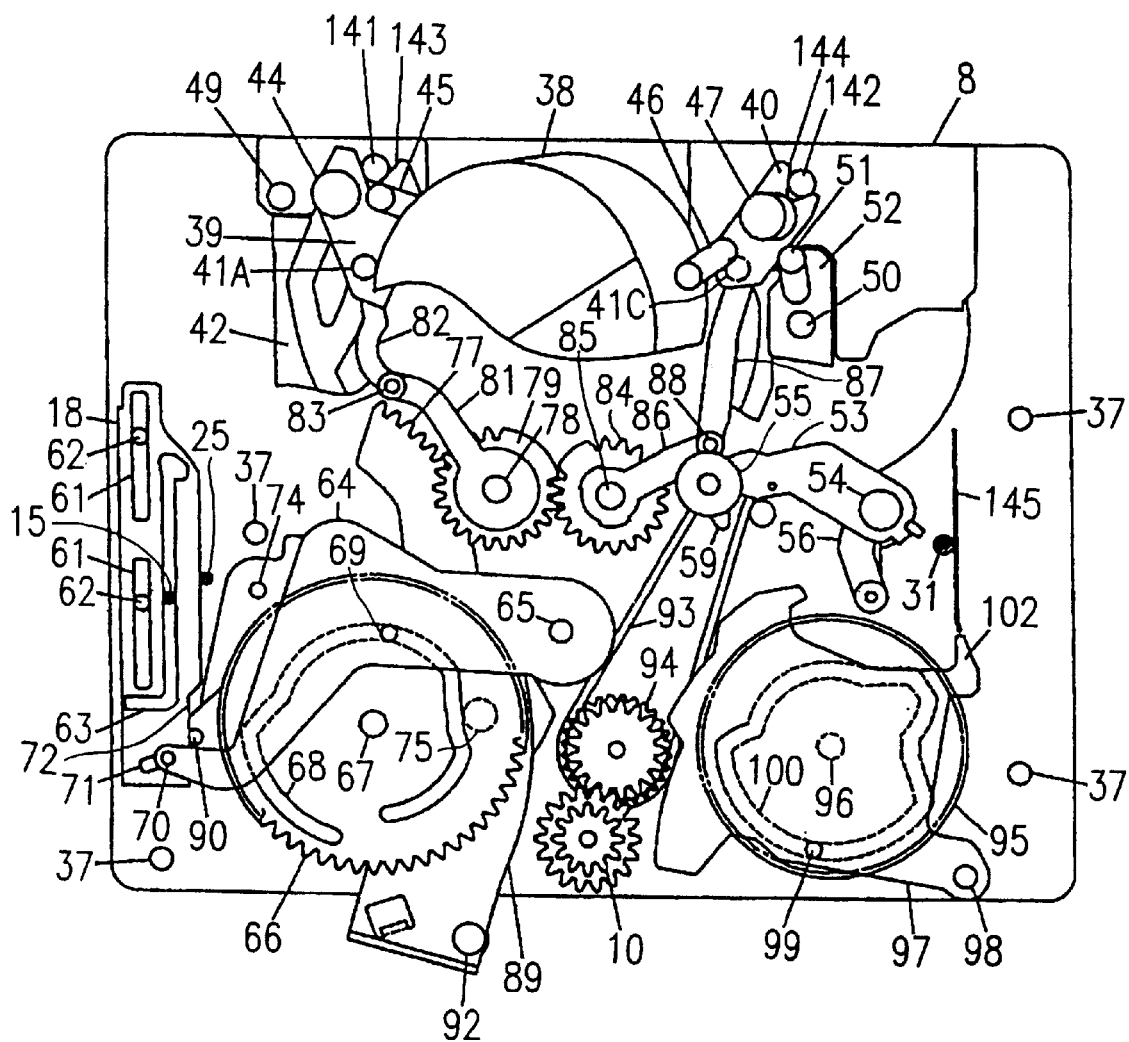
FIG. 19 is a plan view illustrating the magnetic recording/reproduction apparatus in the loaded mode 2 with the subchassis being removed.

FIGS. 18 and 19 are plan views similar to FIG. 3 illustrating an embodiment of the present Invention, but with the subchassis 3 being removed.

FIG. 18 illustrates the magnetic recording/reproduction apparatus in the loaded mode 1, and FIG. 19 illustrates the magnetic recording/reproduction apparatus in the loaded mode 2. As described above, the unloaded mode is illustrated in FIG. 3. Elements in FIGS. 18 and 19 having like reference numerals to those shown in FIG. 3 will not be further described.

Figure 22:
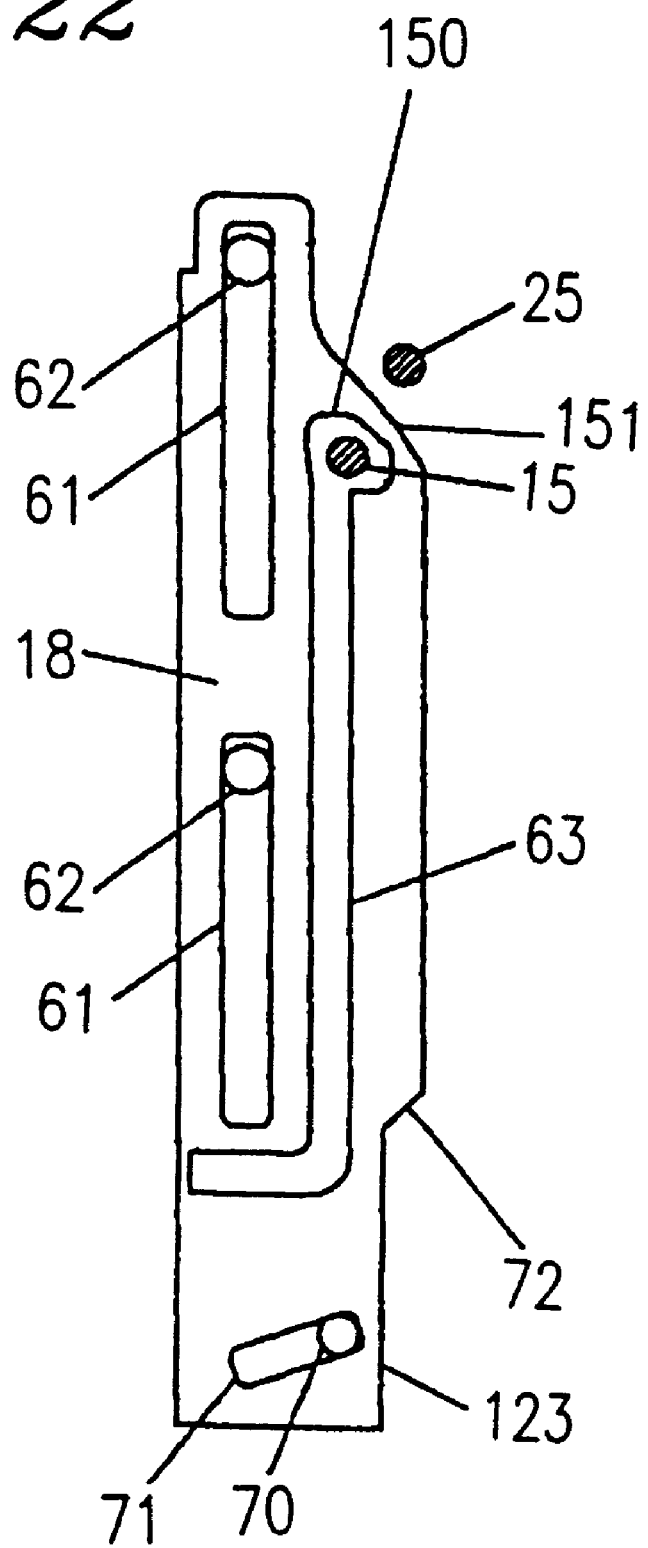
FIG. 22 is a plan view illustrating the tension plate and the peripheral elements of the magnetic recording/reproduction apparatus in the play mode.
Figure 23:
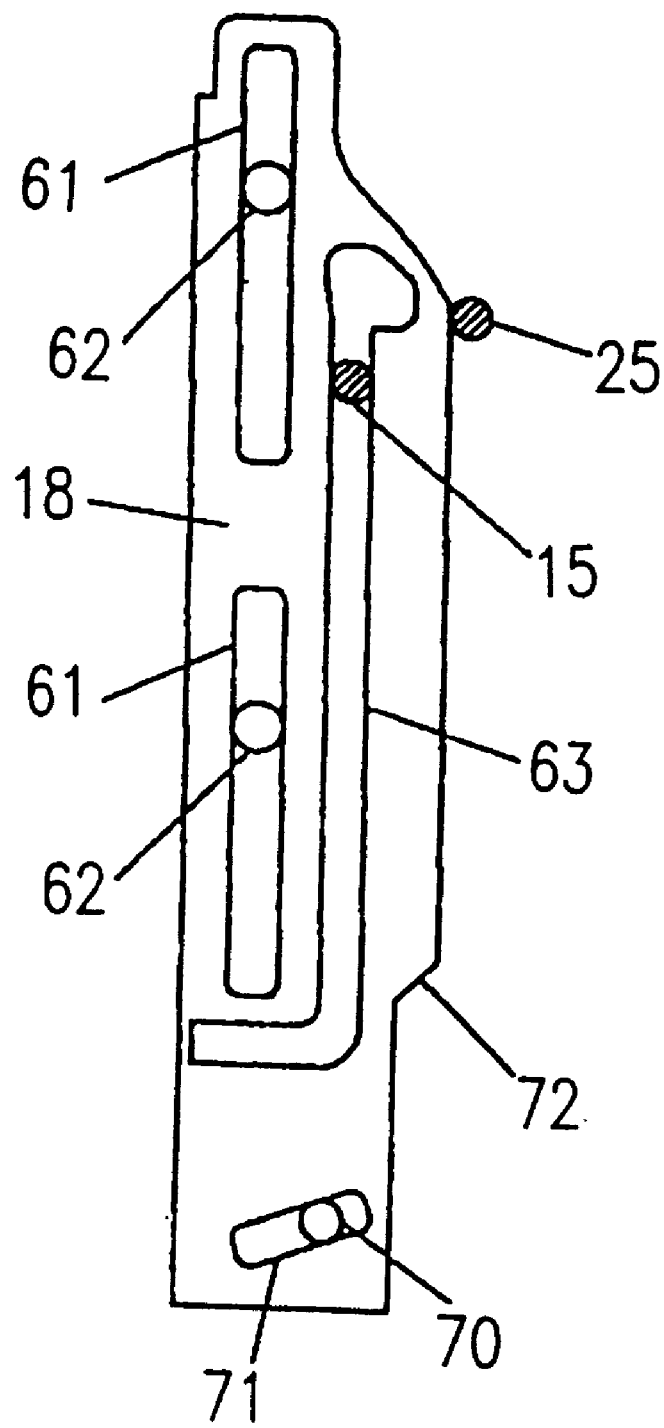
FIG. 23 is a plan view illustrating the tension plate and the peripheral elements of the magnetic recording/reproduction apparatus in the stop or reverse mode.

FIGS. 20 to 23 are detailed views illustrating the tension plate 18 and the peripheral elements. In particular, FIGS. 20 to 23 illustrate the positional relationship among the tension plate 18, the tension arm regulating pin 15, the pin 25 and the guide pins 62, in the loaded mode 1, the loaded mode 2, the play mode, and the stop or reverse mode, respectively. Note that, in the present embodiment of the invention, the positional relationship among these elements is the same in the stop mode and in the reverse mode, as illustrated in FIG. 23.

As described above, the positional relationship among these elements in the unloaded mode is illustrated in FIG. 4. Elements in FIGS. 20 to 23 having like reference numerals to those shown in FIG. 4 will not be further described.

FIGS. 24 to 30 illustrate an operation where the boat drive arm 73 and the subchassis drive arm 89 are driven by the drive pin 75 provided in the cam gear 66 (shown in FIG. 3). FIGS. 24 to 30 correspond to the unloaded mode, the loaded mode 1, the loaded mode 2, a "pre-play mode", the play mode, the stop mode, the reverse mode, respectively. Herein, the "pre-play mode" is between the loaded mode 2 and the play mode and is close to the loaded mode 2.

Figure 32:
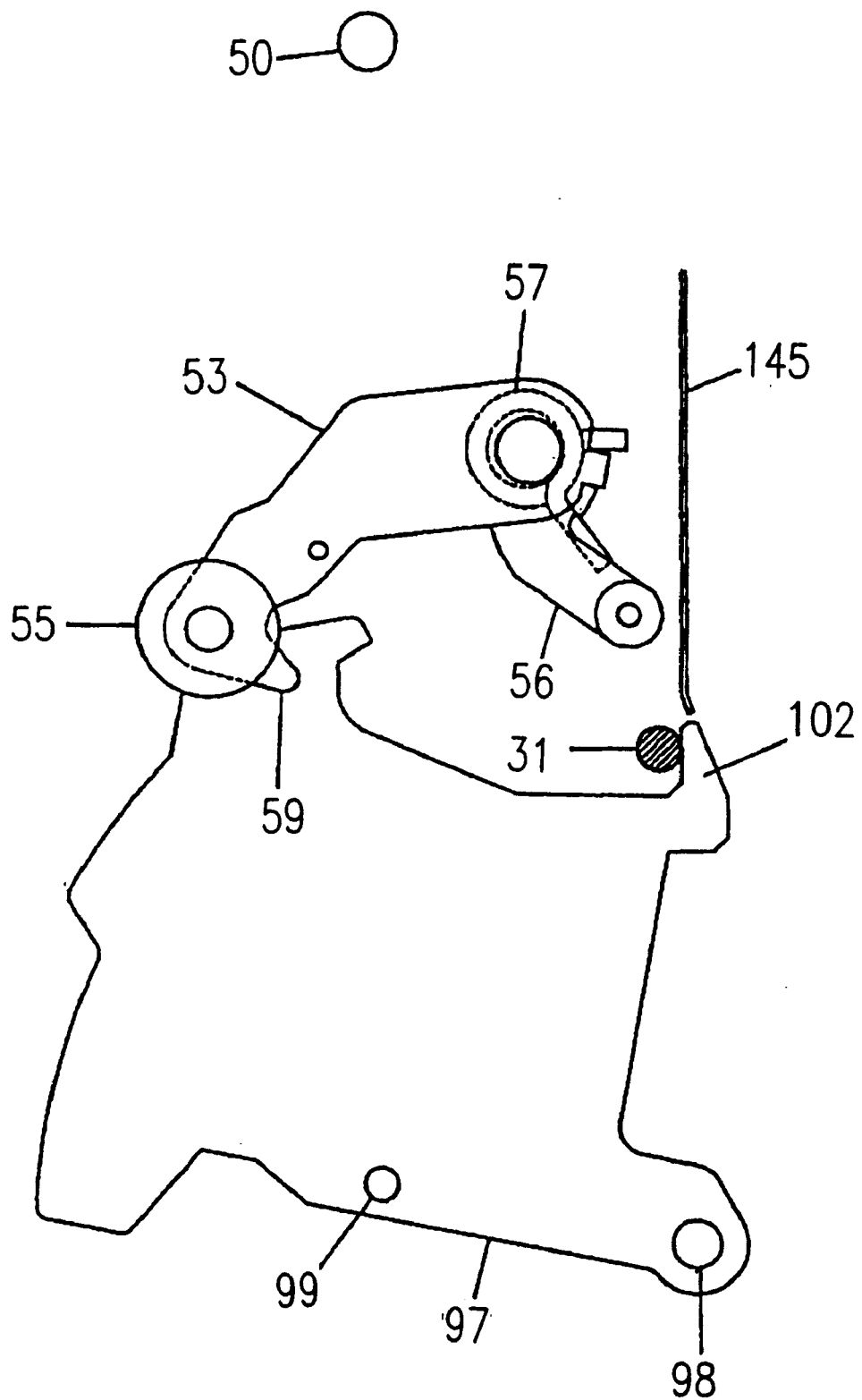
FIG. 32 is a plan view illustrating the relative positions of the pinch arm and the T4 arm of the magnetic recording/reproduction apparatus in the loaded mode 1.
Figure 33:
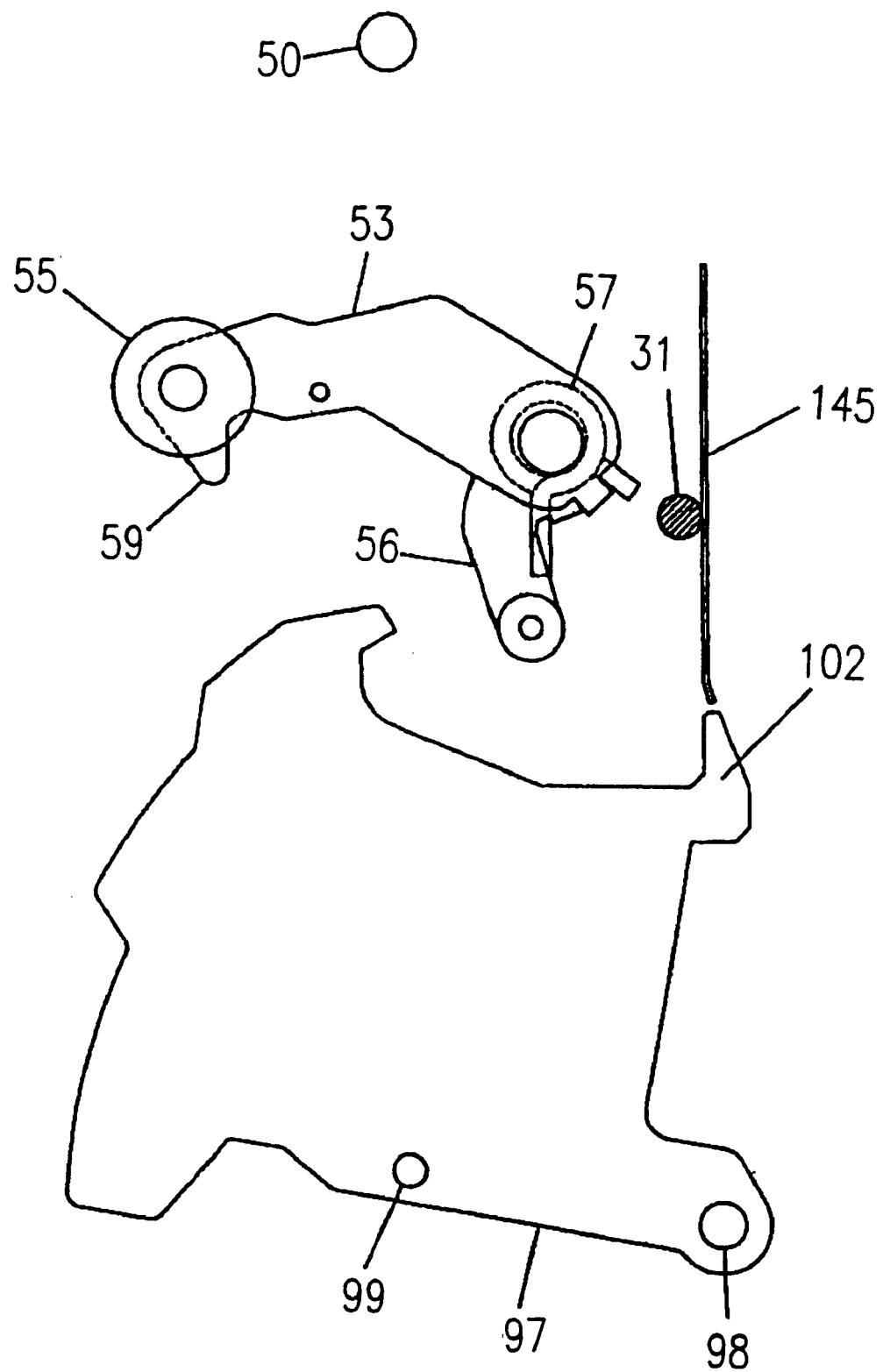
FIG. 33 is a plan view illustrating the relative positions of the pinch arm and the T4 arm of the magnetic recording/reproduction apparatus in the loaded mode 2.
Figure 34:
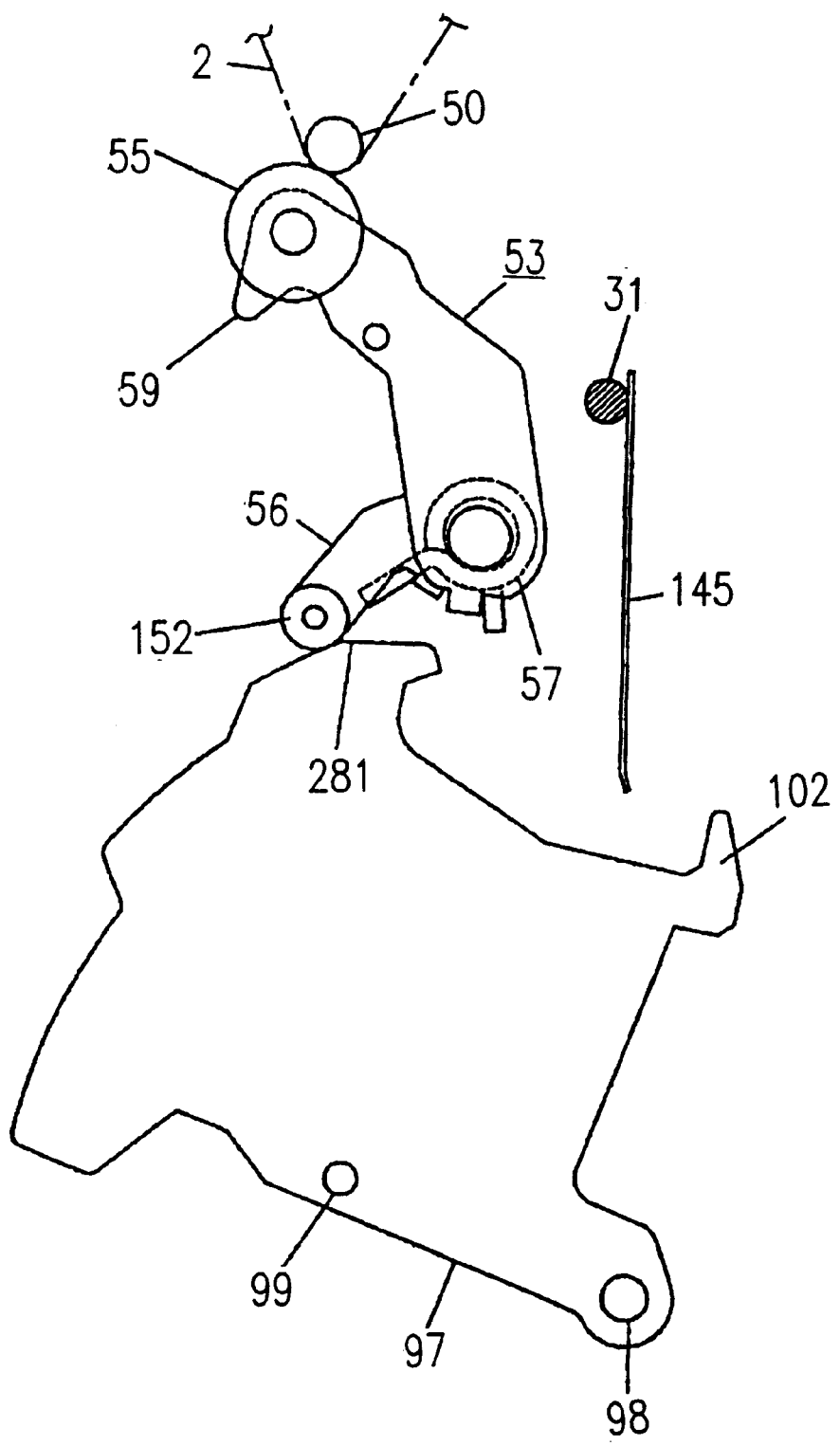
FIG. 34 is a plan view illustrating the relative positions of the pinch arm and the T4 arm of the magnetic recording/reproduction apparatus in the play or reverse mode.

FIGS. 31 to 35 illustrate an operation where the pinch arm 53 on the main chassis 8 and the T4 arm 28 on the subchassis 3 are driven by the pinch drive arm 97. In FIGS. 31 to 35, the T4 arm 28 itself is not shown, but only the T4 arm regulating pin 31 provided thereon is shown. FIGS. 31 to 35 correspond to the unloaded mode, the loaded mode 1, the loaded mode 2, the play and reverse modes, and the stop mode, respectively. Note that in the present embodiment of the invention, the respective movements of the pinch drive arm 97, the pinch arm 53 and the T4 arm 28 are the same in the play mode and in the reverse mode, as illustrated in FIG. 34.

An operation for transiting from the unloaded mode to the reverse mode according to the present embodiment of the invention will be described. As described above, FIGS. 1, 3, 4, 24 and 31 relate to the unloaded mode.

In FIG. 1, the tape 2 has not been pulled out from the cassette 1.

Figure 24:
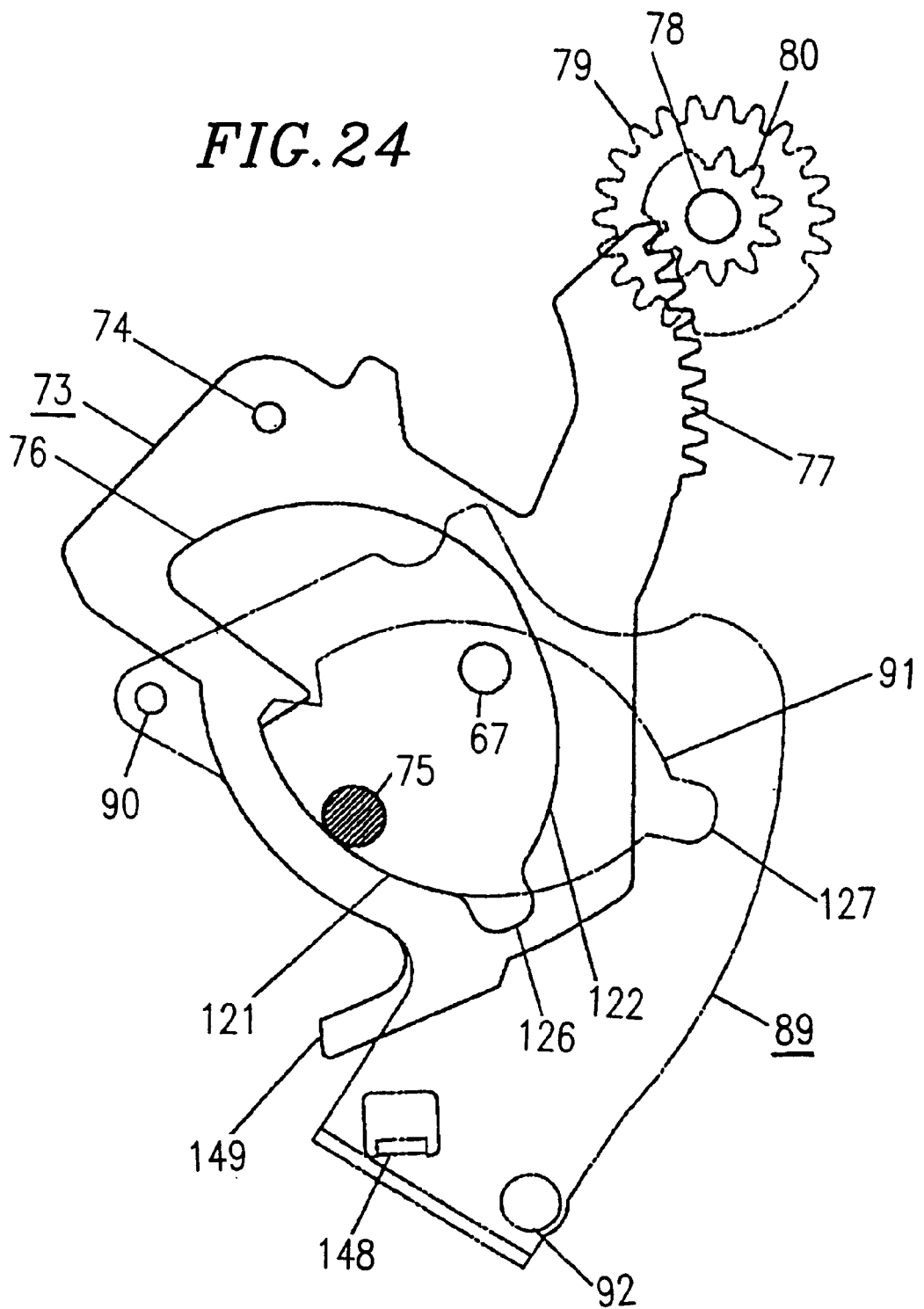
FIG. 24 is a plan view illustrating the relative positions of a boat drive arm and a subchassis drive arm of the magnetic recording/reproduction apparatus in the unloaded mode.

In FIGS. 1, 3 and 24, the subchassis 3 is in the farthest position from the main chassis 8. The drive pin 75 on the cam gear 66 is in contact with respective first arc portions 121 and 122 of the inner cams 91 and 76 provided in the subchassis drive arm 89 and the boat drive arm 73. The subchassis drive arm 89 and the boat drive arm 73 are in their farthest rotational positions in the clockwise direction.

The S load gear 79 is in the state of having been rotated counterclockwise to the maximum by the gear portion 77 of the boat driving arm 73. This state of the S load gear 79 forces the S boat 39 to be located at the most forward position in the elongated hole 43 of the rail 42 as is understood from the construction shown in FIG. 5. Likewise, the T load gear 84 is in the state of having been rotated clockwise to the maximum. This state of the T load gear 84 forces the T boat 40 to be located at the most forward position in the elongated hole 43 of the rail 42 as is understood from the construction shown in FIG. 5.

In FIGS. 1, 3 and 4, the tension plate 18 is in its rearmost position (the lower most position in the FIGS.) corresponding to the position of the tension plate drive arm 64, and the tension arm 12 is in the farthest rotational position in the clockwise direction corresponding to the position of the tension arm regulating pin 15 along the cam groove 63 in the tension plate 18.

The pin 25 provided in the tension band regulating arm 21 is located along a lower depression 123 of the right edge cam 72 of the tension plate 18, where the tension band regulating arm 21 is stopped by the tension arm stop plate 116.

The tension band regulating arm 21 is biased in the counterclockwise direction by the twisted coil spring 24 into contact with, and stopped by, the tension arm stop plate 116.

In this position, the end 124 of the tension band 19 is close to the S reel base 4, whereby the tension band 19 is slack, but the other end 125 of the tension band 19 is moved by the tension band regulating arm 21 away from the S reel base 4, thereby reducing the slack of the tension band 19.

Moreover, the protrusion A 118 of the tension band 19 is pushed by the band regulating protrusion 120 provided in the tension arm 12, thereby also reducing the slack of the tension band 19. These together prevent the tension band 19 from slacking and thus dropping off the S reel base 4.

Figure 31:
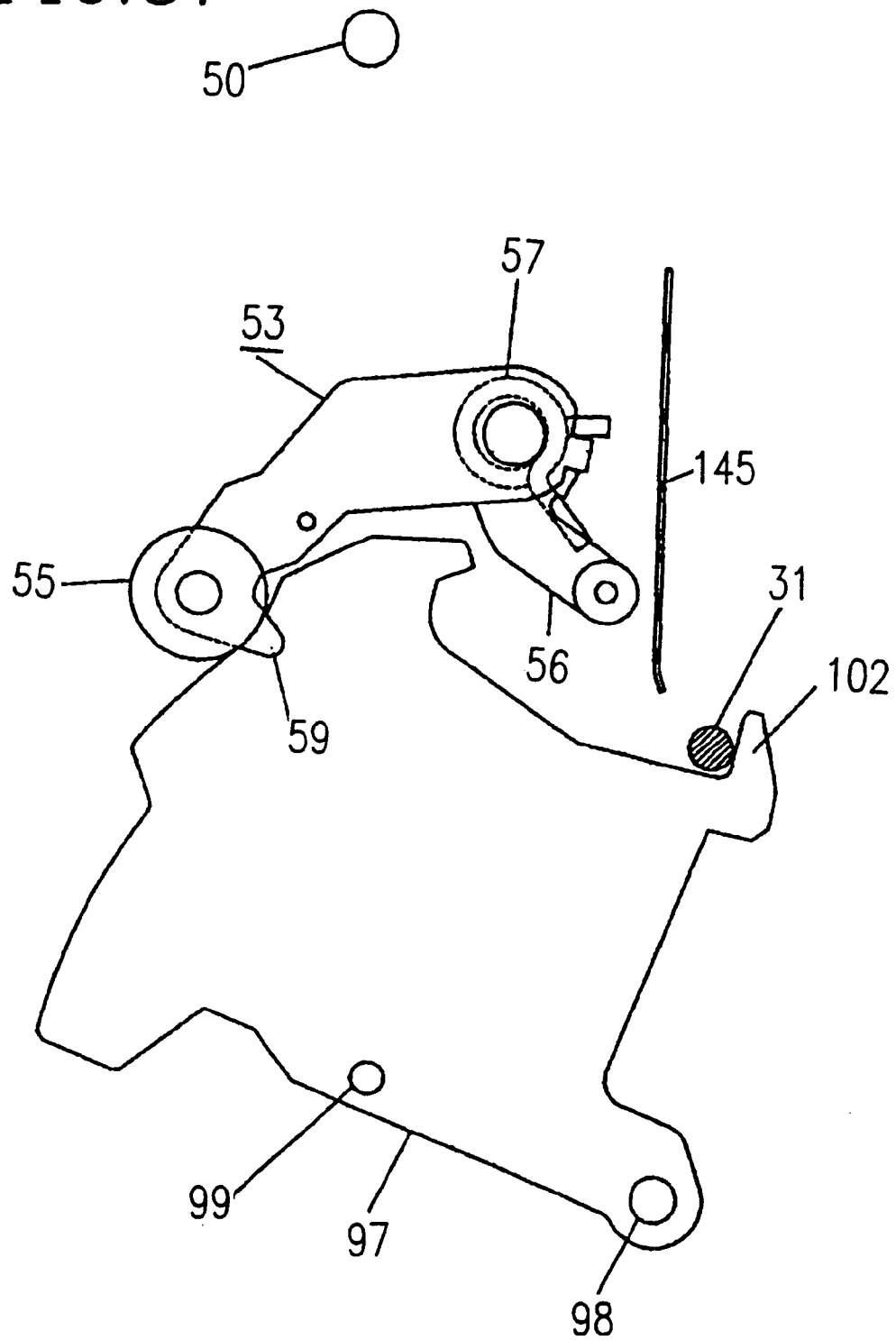
FIG. 31 is a plan view illustrating the relative positions of the pinch arm and the T4 arm of the magnetic recording/reproduction apparatus in the unloaded mode.

In FIGS. 1, 3 and 31, the pinch arm 53 has been pivoted to its farthest pivotal position in the counterclockwise direction by the tension spring 58. In this position, the pinch drive arm 97 is not in contact with the pinch arm 53.

The T4 arm 28 is in its farthest pivotal position in the counterclockwise direction.

The loaded mode 1 will now be described with reference to FIGS. 13, 18, 20, 25 and 32.

Referring to FIG. 13, the tape 2 has been pulled out by the tension post 14 and the T4 post 30 to the position illustrated in FIG. 13. The tape 2 has been partially wound around the S1 post 45 on the S boat 39 and the cylinder 38.

Figure 25:
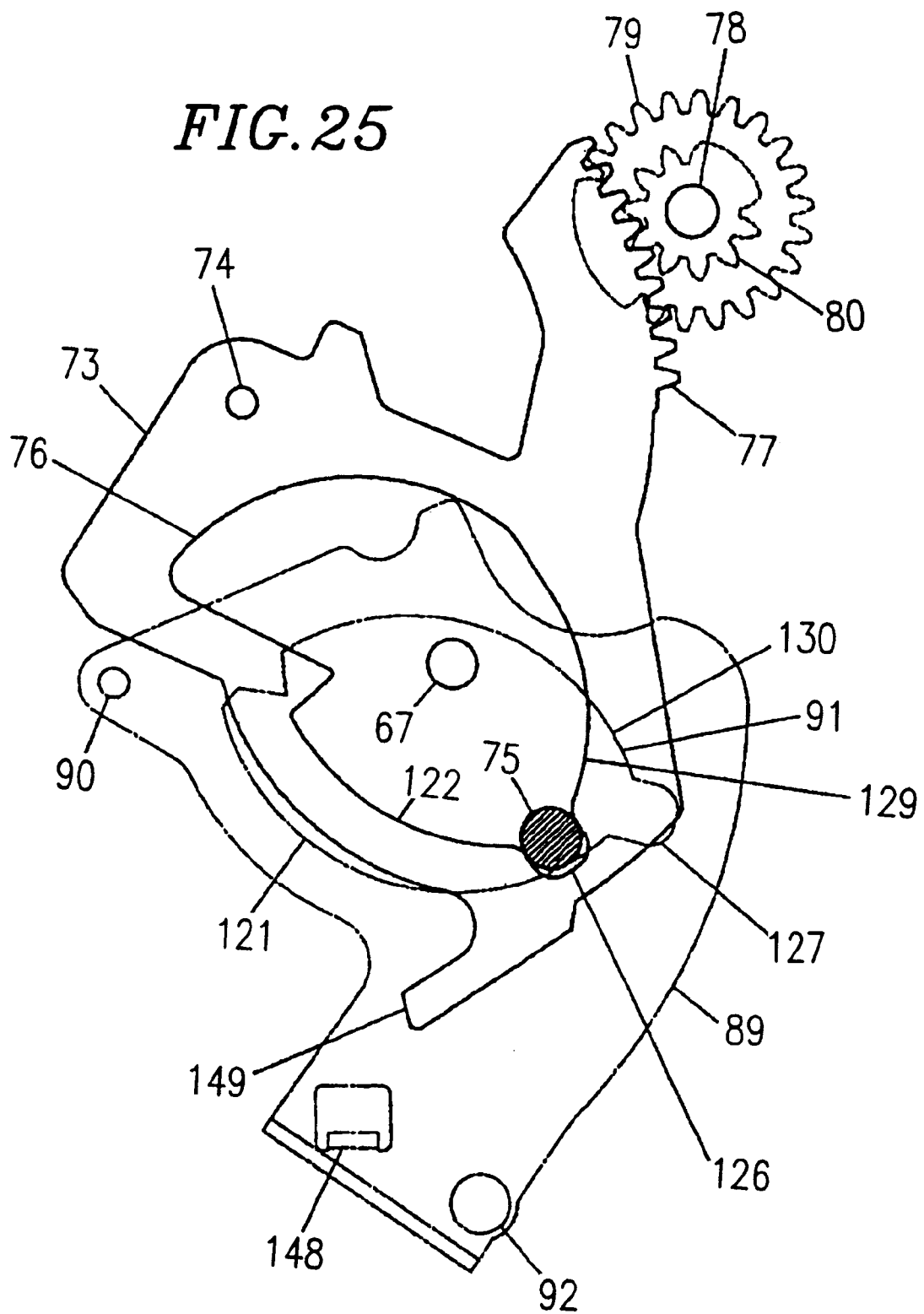
FIG. 25 is a plan view illustrating the relative positions of the boat drive arm and the subchassis drive arm of the magnetic recording/reproduction apparatus in the loaded mode 1.

In FIGS. 13, 18 and 25, the drive pin 75 on the cam gear 66 is still on the first arc portion 121 of the subchassis drive arm 89, and the subchassis 3 has not been driven and is in its unloaded mode position. In the boat drive arm 73, on the other hand, the drive pin 75 has passed the first arc portion 122 and is engaged with a depression 126 provided in the inner cam 76, and the boat drive arm 73 has started rotating in the counterclockwise direction, with the S boat 39 and the T boat 40 being moved along the rail 42 in the direction to pull out the tape 2 by the S load gear 79 and the T load gear 84, respectively.

Figure 20:
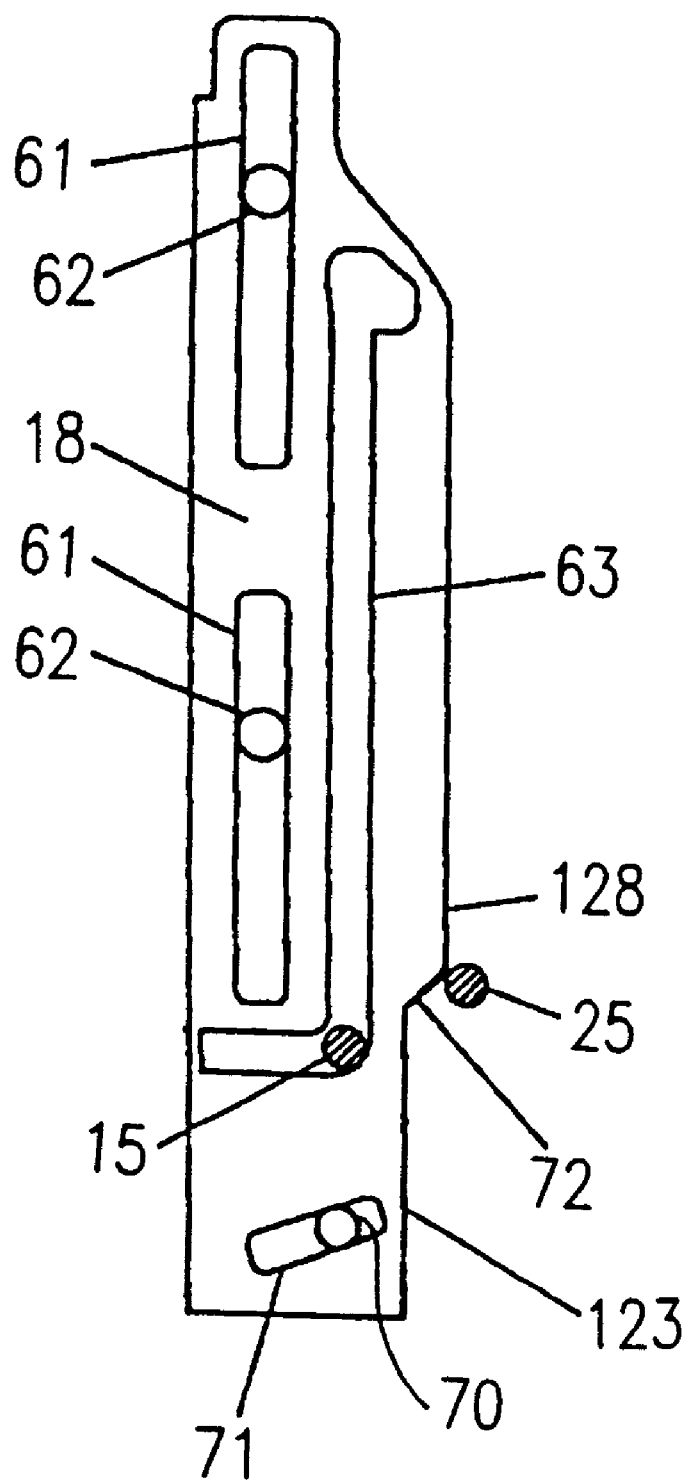
FIG. 20 is a plan view illustrating the tension plate and the peripheral elements of the magnetic recording/reproduction apparatus in the loaded mode 1.
Figure 21:
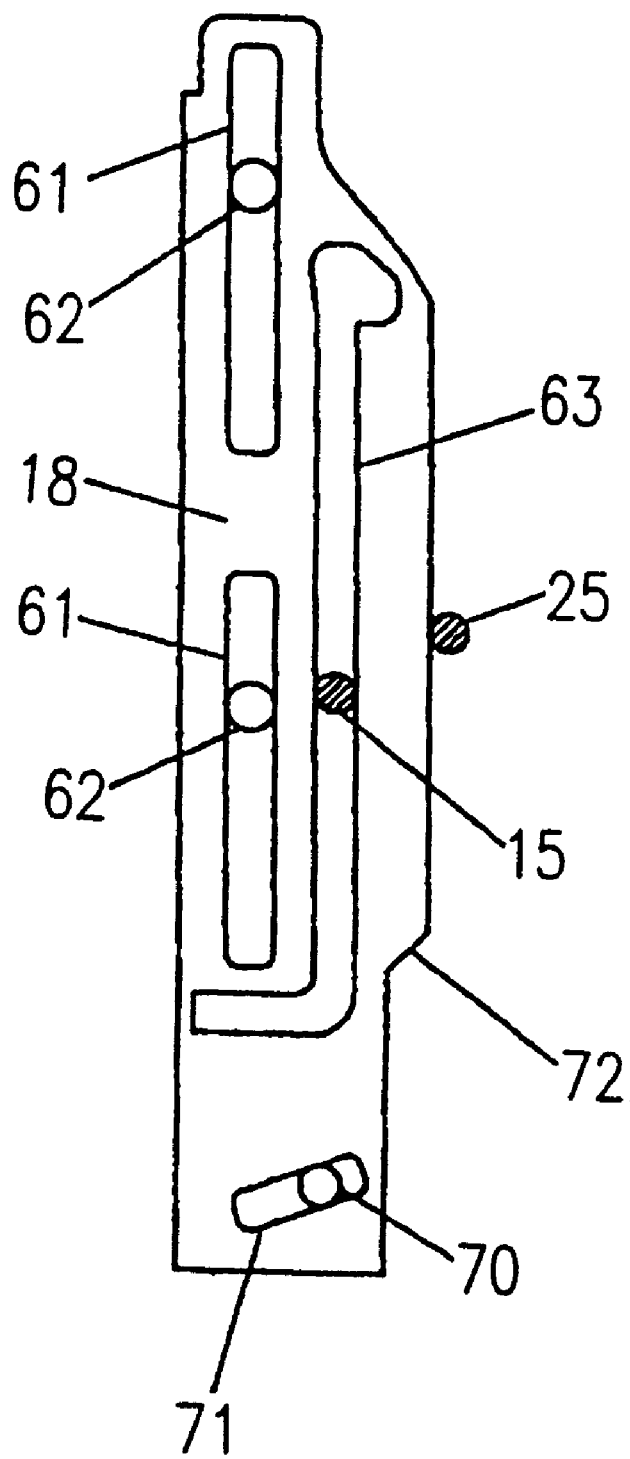
FIG. 21 is a plan view illustrating the tension plate and the peripheral elements of the magnetic recording/reproduction apparatus in the loaded mode 2.

In FIGS. 13, 18 and 20, the tension plate 18 is moved by the tension plate drive arm 64 to the forward side (the cylinder side), along with which the tension arm regulating pin 15 is driven by the cam groove 63 of the tension plate 18 so as to rotate the tension arm 12 in the counterclockwise direction, thereby pulling out the tape 2. Along with the movement of the tension plate 18, the tension band regulating arm 21 is rotated by a protrusion 128 of the right edge cam 72 in the clockwise direction. Therefore, the tension band 19 slackens for the cylindrical portion 26 of the S reel base 4 so that the S reel base 4 is allowed to rotate.

In FIGS. 13, 18 and 32, the subchassis 3 has not been moved, whereby the pinch arm 53 is in its position as in the unloaded mode.

The T4 arm 28 is moved to pull out the tape 2 by the protrusion 102 of the pinch drive arm 97 via the T4 arm regulating pin 31.

The loaded mode 2 will now be described with reference to FIGS. 14, 19, 21, 26 and 33.

Referring to FIG. 14, the cassette 1 is moving toward the cylinder 38, and the tape 2 is being wound around the cylinder 38 by the S2 post 44, the S1 post 45, the T1 post 46 and the T2 post 47. While the S boat 39 and the T boat 40 have been moved to their predetermined positions, the tension post 14 and the T4 post 30 are still on their way to the predetermined positions, whereby the predetermined tape driving path for recording/reproducing data to/from the tape 2 has not been complete.

Figure 26:
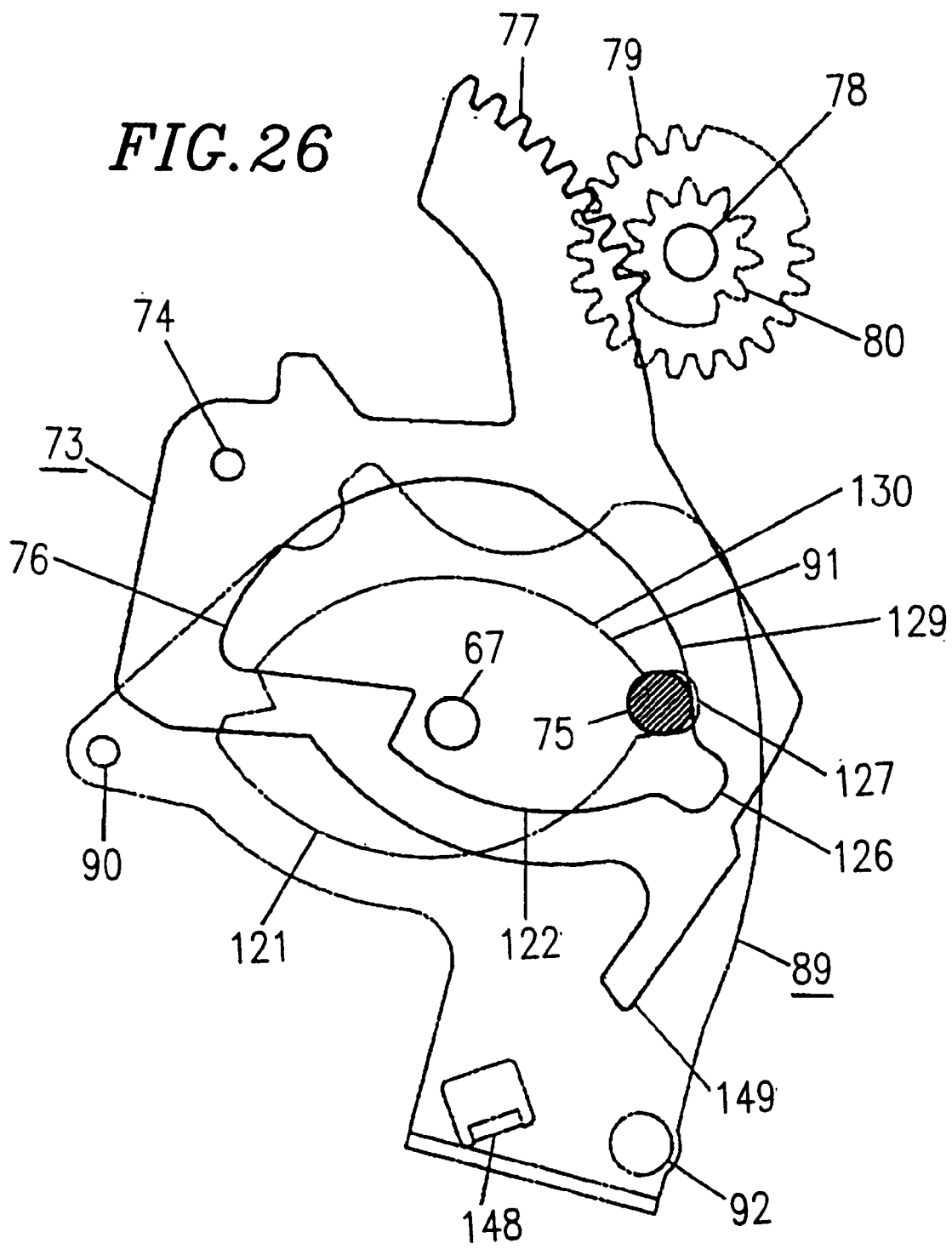
FIG. 26 is a plan view illustrating the relative positions of the boat drive arm and the subchassis drive arm of the magnetic recording/reproduction apparatus in the loaded mode 2.

In FIGS. 14, 19 and 26, the drive pin 75 on the cam gear 66 has passed the first arc portion 121 of the subchassis drive arm 89 to be engaged with a depression 127 provided in the inner cam 91. Thus, the subchassis drive arm 89 has started rotating in the counterclockwise direction, with the subchassis 3 being moved toward the cylinder 38 via the guide pin 92.

In the boat drive arm 73, on the other hand, the drive pin 75 has passed the depression 126 provided in the inner cam 91 and is located along a second arc portion 129. While the drive pin 75 is in the depression 126, the drive pin 75 rotates the boat drive arm 73. However, while the drive pin 75 is located along the first arc portion 122 or the second arc portion 129, the boat drive arm 73 stays in a predetermined position.

The boat drive arm 73 is in the farthest rotational position in the counterclockwise direction, and the S boat 39 and the T boat 40 have been moved to their predetermined positions on the main chassis 8 via the gear portion 77, the S load gear 79 and the T load gear 84.

Boat stoppers 141 and 142 are provided on the main chassis 8 for stopping the S boat 39 and the T boat 40 by contacting the S boat 39 and the T boat 40 at their V-shaped portions 143 and 144, respectively (FIG. 19). The S load gear 79 and the S load arm 81 rotate integrally during the movement of the S boat 39. Likewise, the T load gear 84 and the T load arm 86 rotate integrally during the movement of the T boat 40. The S load link 82 and the S load arm 81 are configured so that the S boat 39 reaches a predetermined position at a time slightly before the mode shift from the loaded mode 1 to the loaded mode 2. Likewise, the T load link 87 and the T load arm 86 are configured so that the T boat 40 reaches a predetermined position at a time slightly before the mode shift from the loaded mode 1 to the loaded mode 2. During the remaining time until the start of the loaded mode 2, the boat driving arm 73 rotates the S load gear 79 clockwise and the T load gear 84 counterclockwise. As a result, since the S load gear 79 has rotated slightly relative to the S load arm 81, a torsion coil spring (not shown) resting between the S load gear 79 and the S load arm 81 is twisted. By the repulsive force of the twisted torsion coil spring, the S boat 39 is pressed against the boat stopper 141 and secured thereto. Likewise, since the T load gear 84 has rotated slightly relative to the T load arm 86, a torsion coil spring (not shown) resting between the T load gear 84 and the T load arm 86 is twisted. By the repulsive force of the twisted torsion coil spring, the T boat 40 is pressed against the boat stopper 142 and secured thereto.

In FIGS. 14, 19 and 24, the relative positions of the tension arm 12 and the tension band regulating arm 21 with respect to the subchassis 3 in the loaded mode 1 are maintained unchanged by the tension plate 18 during a tape loading process from the loaded mode 1 until immediately before the play mode. Thus, the relative position of the tension arm 12 with respect to the subchassis 3 is fixed, while the tension band 19 slackens for the cylindrical portion 26 of the S reel base 4 by the pivotal movement of the tension band regulating arm 21 in the clockwise direction so that the S reel base 4 is allowed to rotate.

Referring to FIGS. 14, 19 and 33, along with the movement of the subchassis 3, the pinch arm 53 rotates in the clockwise direction as the protrusion 59 of the pinch arm 53 is pushed by the wall portion 60 of the subchassis 3.

Along with the movement of the subchassis 3, the T4 arm regulating pin 31 on the T4 arm 28 moves from the protrusion 102 of the pinch drive arm 97 onto a T4 guide 145 provided on the main chassis 8.

While the subchassis 3 is moved, the relative position of the T4 arm 28 with respect to the subchassis 3 in the loaded mode 1 is maintained unchanged by the T4 guide 145.

The pre-play mode (immediately before the play mode) will now be described with reference to FIG. 27.

The drive pin 75 on the cam gear 66 has passed the depression 127 of the subchassis drive arm 89 and is located along a second arc portion 130 provided in the inner cam 91.

The subchassis drive arm 89 is in the farthest rotational position in the counterclockwise direction, and the subchassis 3 has been moved to its predetermined position via the guide pin 92. The drive pin 75 is located along the second arc portion 129 of the inner cam 76 of the boat drive arm 73, and the boat drive arm 73 is thus in its position as in the loaded mode 2.

The play mode will now be described with reference to FIGS. 15, 22, 28 and 34.

Referring to FIG. 15, the tape 2 has been pulled out from the cassette 1, thereby completing the tape driving path for recording/reproducing data to/from the tape 2.

The completed tape driving path will be described with reference to FIG. 15.

The tape 2 is pulled out from the tape supply reel (not shown) located on the left side in the cassette 1, and runs around the tension post 14, the S3 post 49 provided on the main chassis 8, the S2 post 44 and the S1 post 45. The tape 2 from the S1 post 45 is wound around the cylinder 38, for a predetermined arc and at a predetermined inclination angle, in conformity with the standard of the tape recording pattern. Past the cylinder 38, the tape 2 runs around the T1 post 46, the T2 post 47 and the T3 post 51, at which time the tape 2 is at the same height as immediately after the cassette 1, without any twist. Then, the tape 2 runs around the capstan 50, which is perpendicular to the tape driving direction, and the T4 post 30, after which the tape 2 runs around the take-up reel (not shown) located on the right in the cassette 1.

The tension post 14, the S3 post 49, the S2 post 44, T2 post 47 and T4 post 30 are perpendicular to the tape driving direction, whereas the S1 post 45, the T1 post 46 and the T3 post 51 are inclined with respect to the tape driving direction.

Figure 27:
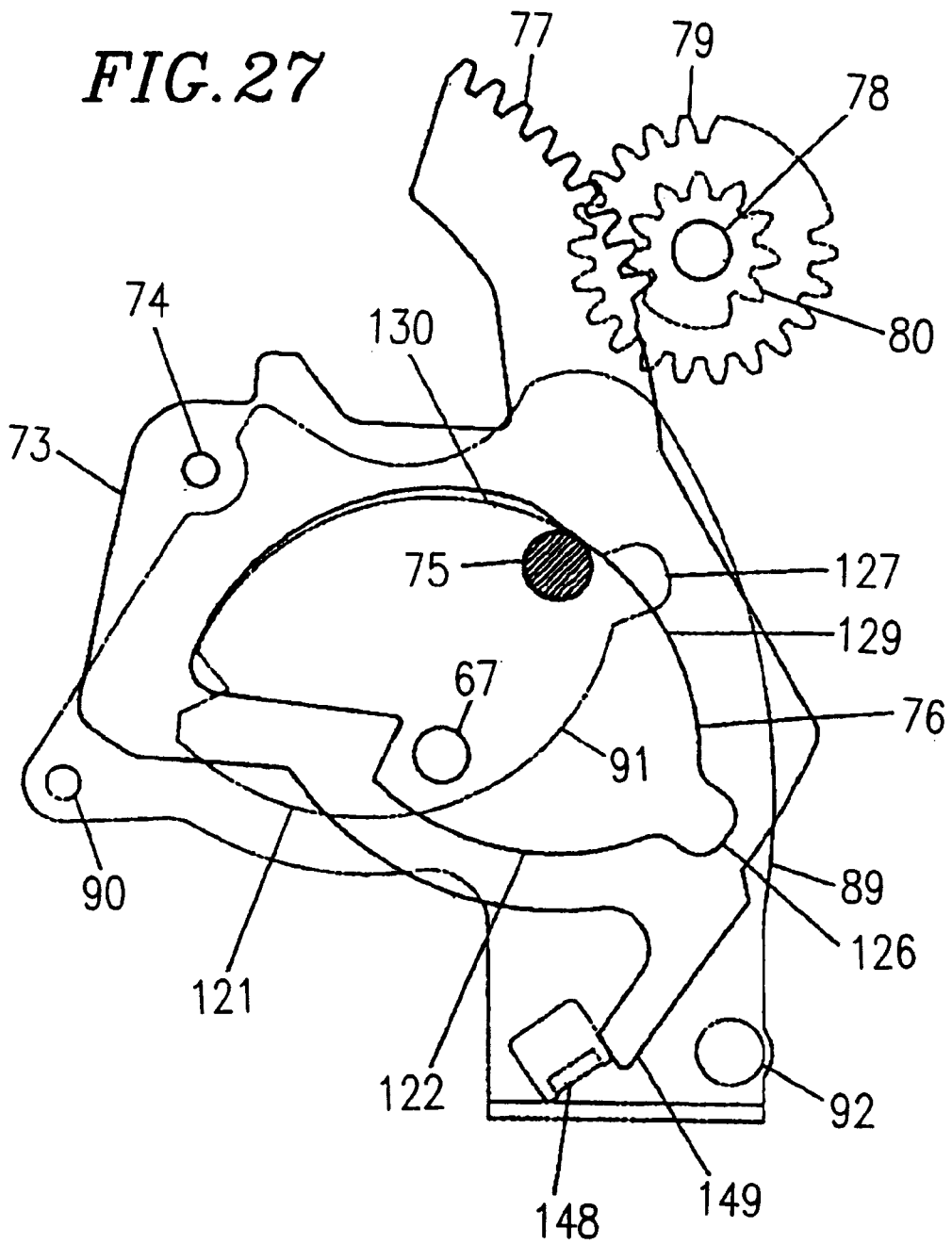
FIG. 27 is a plan view illustrating the relative positions of the boat drive arm and the subchassis drive arm of the magnetic recording/reproduction apparatus in a pre-play mode which is between the loaded mode 2 and the play mode and is close to the loaded mode 2.
Figure 28:
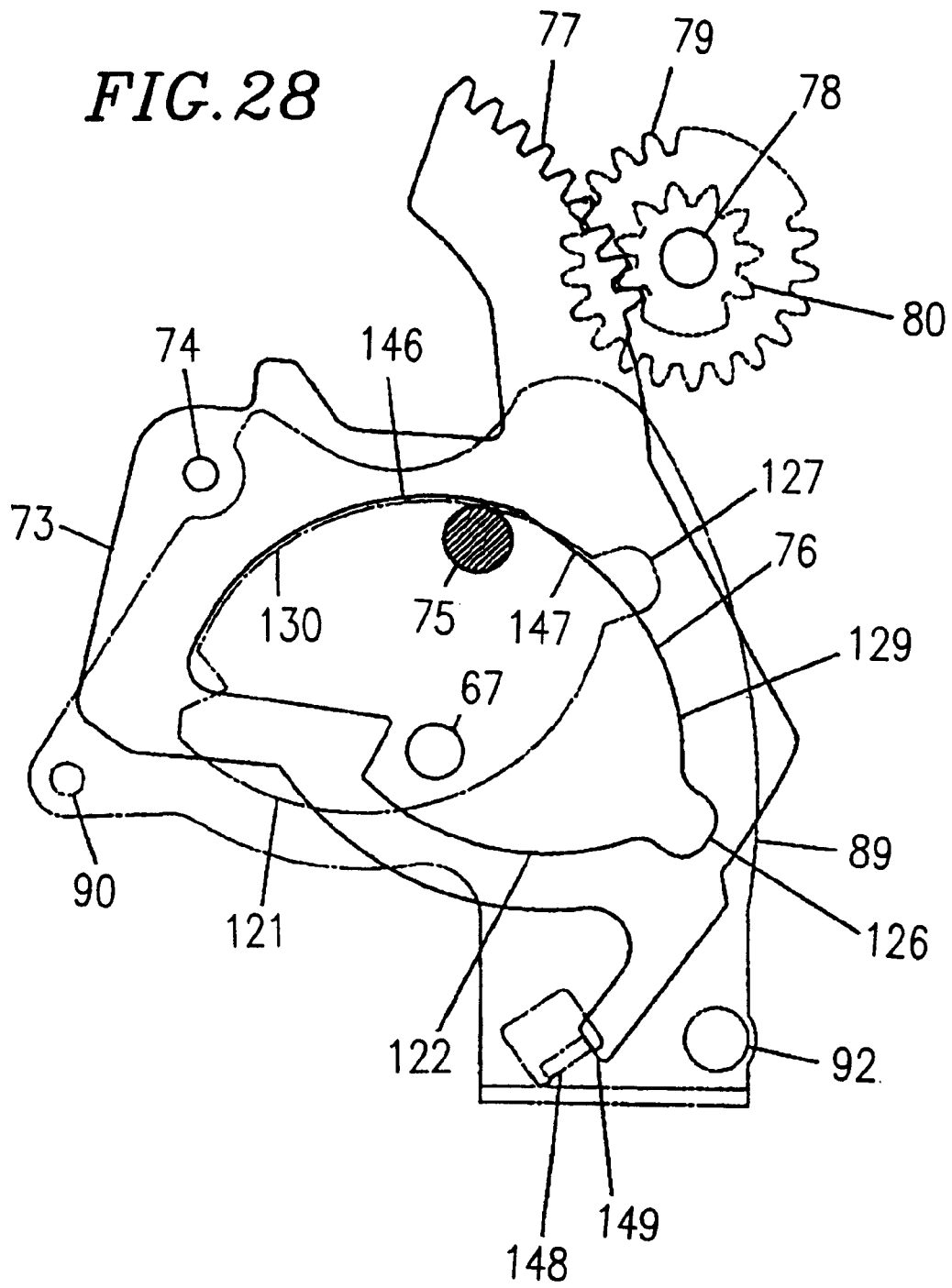
FIG. 28 is a plan view illustrating the relative positions of the boat drive arm and the subchassis drive arm of the magnetic recording/reproduction apparatus in the play mode.

Referring to FIG. 28, the drive pin 75 on the cam gear 66 is located along second arc portion 130 of the subchassis drive arm 89, and the position of the subchassis drive arm 89 is the same as in the pre-play mode, as illustrated in FIG. 27. Thus, the subchassis 3 has been moved completely.

In the boat drive arm 73, on the other hand, the drive pin 75 is located along a third arc portion 146 provided in the inner cam 76.

As illustrated in FIG. 5, the third arc portion 146 (indicated by "D") has a radius which is slightly greater than that of the second arc portion 129 (indicated by "C"). A transitional portion 147 (indicated by "E") extends between the second arc portion 129 and the third arc portion 146.

Referring to FIG. 28, the boat drive arm 73 has been slightly rotated in the clockwise direction from the pre-play mode illustrated in FIG. 27, and a boat drive arm stop portion 148 provided in the subchassis drive arm 89 is in contact with a protrusion 149 of the boat drive arm 73. This small amount of return rotation of the boat drive arm 73 occurring between the pre-play mode and the play mode is sufficiently smaller than the rotational phase difference of the S load gear 79 and the S load arm 81 with respect to the T load gear 84 and the T load arm 86. Therefore, the press-fit connection of the S boat 39 and the T boat 40 onto the boat stoppers 141 and 142 is maintained.

Thus, in the play mode and thereafter, the reacting force from the press-fit connection of the S boat 39 and the T boat 40 is maintained by the boat drive arm stop portion 148, not by the drive pin 75, whereby the position of the boat drive arm 73 is determined by the boat drive arm stop portion 148, not by the drive pin 75.

In FIGS. 15 and 22, the tension arm regulating pin 15 is located at a top free section 150 at the upper end of the cam groove 63.

The tension plate 18 is not in contact with the tension arm regulating pin 15.

The pin 25 provided in the tension band regulating arm 21 is located along an upper depression 151 of the right edge cam 72 of the tension plate 18, and the position of the tension band regulating arm 21 on the subchassis 3 is determined by contacting the tension arm stop plate 116 as in the unloaded mode.

The tension arm 12 is positioned by the tension band 19 being wound around the cylindrical portion 26 of the S reel base 4 without slack by virtue of the tension provided by the tension spring 27. As a frictional force is generated between the tension band 19 and the cylindrical portion 26 of the S reel base 4, and the tape 2 runs around the tension post 14 while being wound therearound under tension, a feedback control is provided for the frictional force so as to stably maintain the tape tension.

The position of the tension post 14 in the play mode can thus be adjusted by moving the tension arm stop plate 116 and fixing it with a screw (not shown).

Referring to FIG. 34, in the play mode, the pinch drive arm 97 is pivoted in the clockwise direction by the pinch cam gear 95, and a pressing cam portion 281 on the pinch drive arm 97 presses the roller 152 axially supported on the pinch press arm 56, whereby the twisted coil spring 57 presses the pinch roller 55 onto the capstan 50 via the tape 2 Thus, the tape 2 is driven by the rotation of the capstan 50.

The position of the T4 arm 28 is maintained by the T4 guide 145.

The stop mode will now be described with reference to FIGS. 16, 23, 29 and 35.

Figure 29:
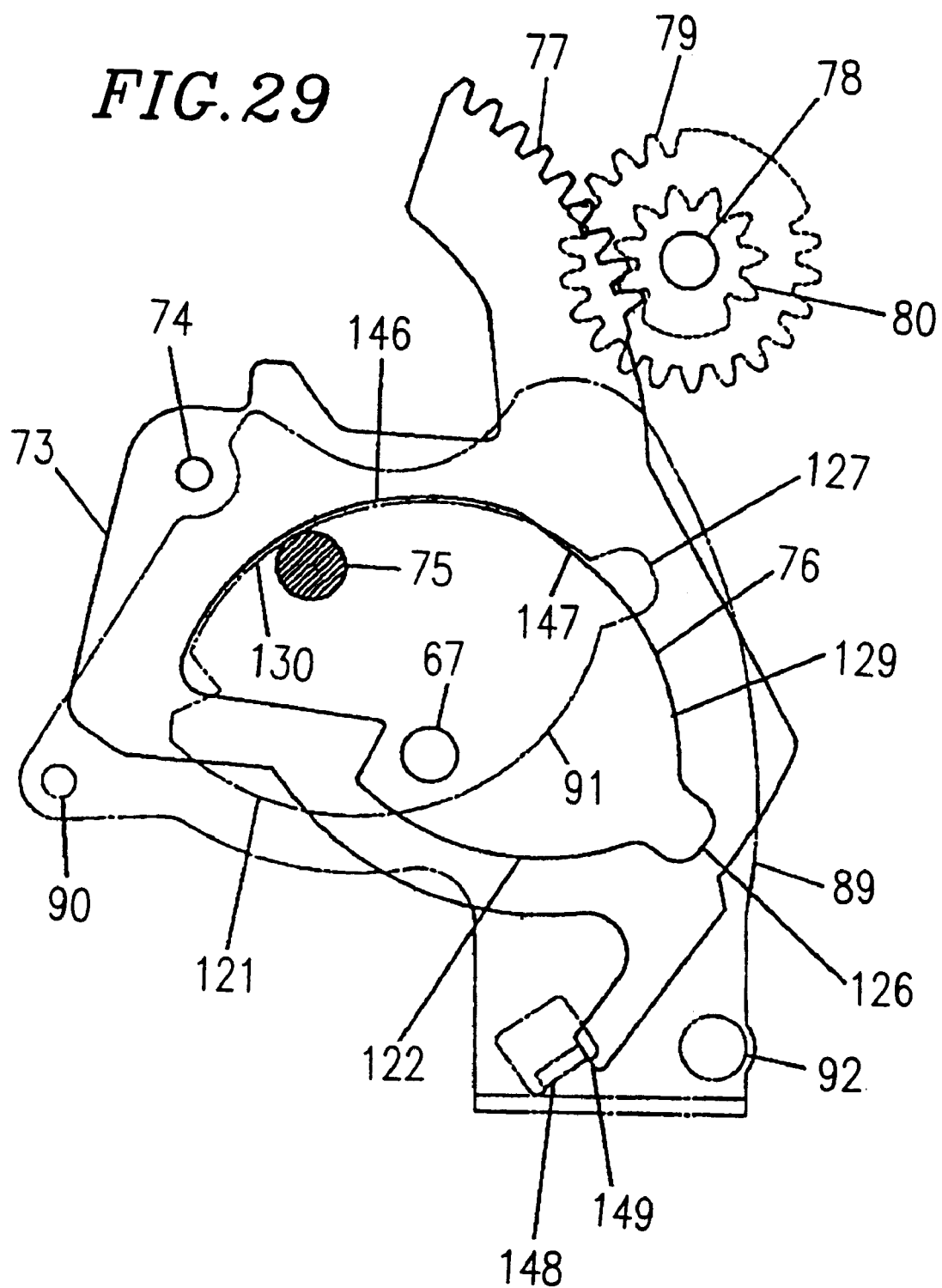
FIG. 29 is a plan view illustrating the relative positions of the boat drive arm and the subchassis drive arm of the magnetic recording/reproduction apparatus in the stop mode.

In FIG. 29, the positions of the subchassis drive arm 89 and the boat drive arm 73 are the same as those in the play mode (see FIG. 28), except that the position of the drive pin 75 on the cam gear 66 is different.

Referring to FIGS. 16 and 23, the tension plate 18 is slightly moved toward the rear side by the tension plate drive arm 64 from the play mode (see FIG. 22). The relative positions of the tension arm 12 and the tension band regulating arm 21 with respect to the subchassis 3 are the same as those in the loaded mode 1 and the loaded mode 2.

Referring to FIG. 29, the subchassis drive arm 89 and the boat drive arm 73 are in the same state as that in the play mode (see FIG. 28), with only the drive pin 75 on the cam gear 66 being moved.

Figure 35:
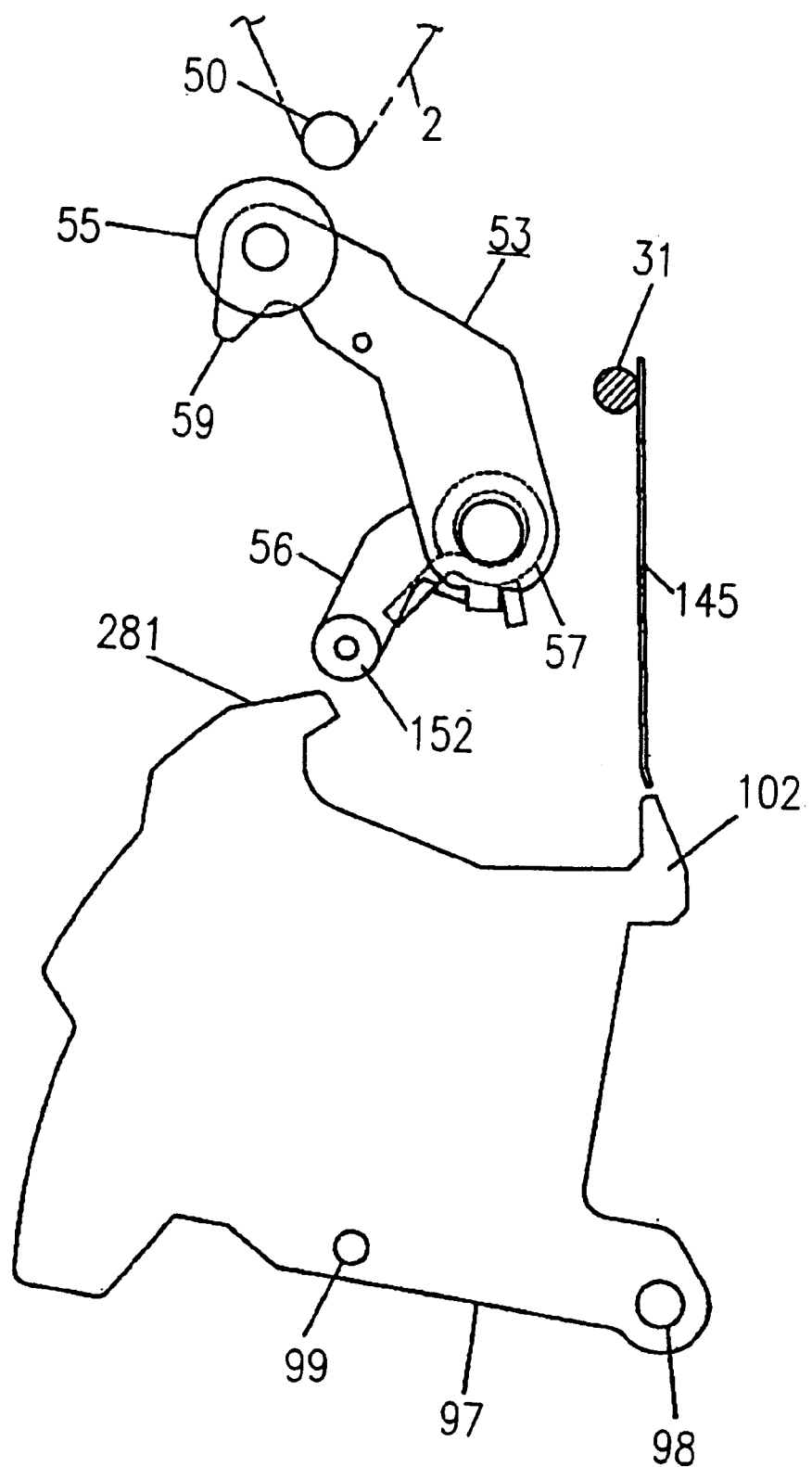
FIG. 35 is a plan view illustrating the relative positions of the pinch arm and the T4 arm of the magnetic recording/reproduction apparatus in the stop mode.
Figure 36:
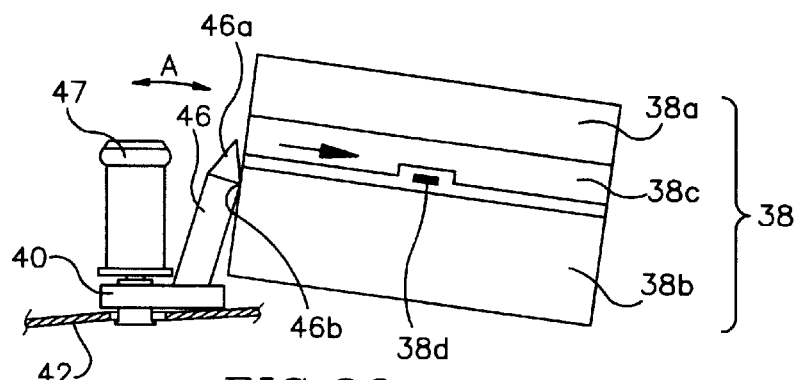
FIG. 36 illustrates a main feature of the magnetic recording/reproduction apparatus.

Referring to FIGS. 16 and 35, the pinch drive arm 97 is rotated in the counterclockwise direction and is not in contact with the roller 152 of the pinch press arm 56. The pinch arm 53 is biased in the counterclockwise direction by the tension spring 58 and is in contact with the wall portion 60 of the subchassis 3. In this position, the pinch roller 55 and the capstan 50 are spaced apart from each other.

The reverse mode will now be described with reference to FIGS. 17, 23, 30 and 34.

Figure 30:
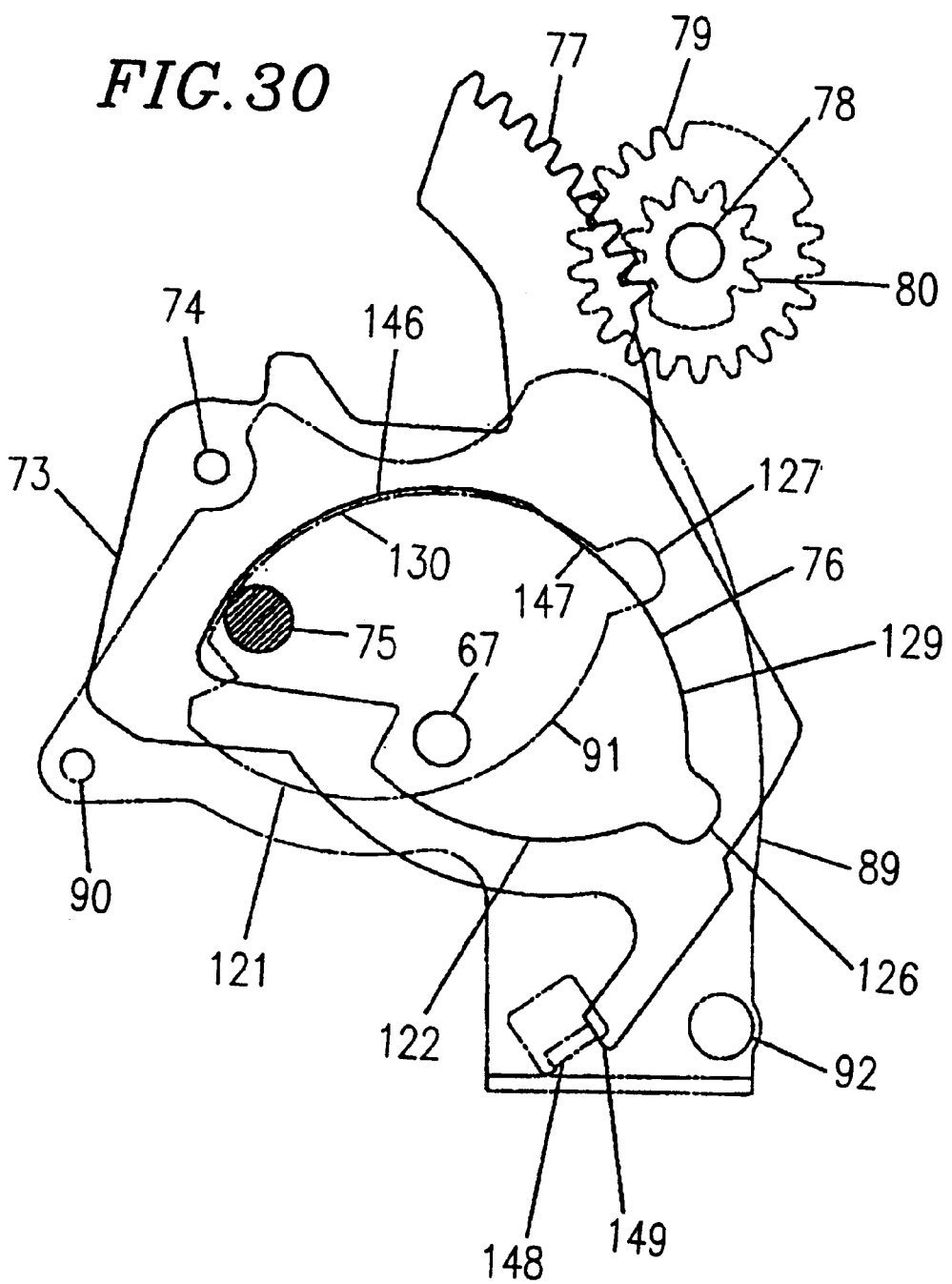
FIG. 30 is a plan view illustrating the relative positions of the boat drive arm and the subchassis drive arm of the magnetic recording/reproduction apparatus in the reverse mode.

Referring to FIG. 30, the positions of the subchassis drive arm 89 and the boat drive arm 73 are the same as those in the play mode (see FIG. 28) and the stop mode (see FIG. 29), with only the drive pin 75 on the cam gear 66 being moved.

The tension plate 18 does not move from its position in the stop mode, and the positions of the tension arm 12 and the tension band regulating arm 21 are the same as those in the stop mode, as illustrated in FIG. 23.

The pinch drive arm 97 is rotated again in the clockwise direction from the stop mode, as illustrated in FIG. 35, to the same position as in the play mode, as illustrated in FIG. 34, whereby the pinch arm 53 is in the same state as in the play mode. The T4 arm 28 stays in the same state as in the play mode, in the stop mode and in the reverse mode.

FIG. 36 illustrates the T1 post 46 (the inclined post) mounted on the T boat 40 located closest to the cylinder 38 between the loaded mode 1 and the loaded mode 2. As illustrated in FIG. 36, the cylinder 38 includes three portions (an upper cylinder 38a, an intermediate cylinder 38a and a lower cylinder 38b). The upper cylinder 38a and the lower cylinder 38b do not rotate. The intermediate cylinder 38a includes a head 38d mounted thereon, and rotates at a high speed. The inclined post (T1 post) 46 mounted on the T boat 40 includes a tapered tip 46a. The T boat 40 is guided by the rail 42, but the T boat 40 has some play and thus can move slightly in a direction indicated by an arrow A in FIG. 38 because of the gap between the rail 42 and the T boat 40.

Figure 38:
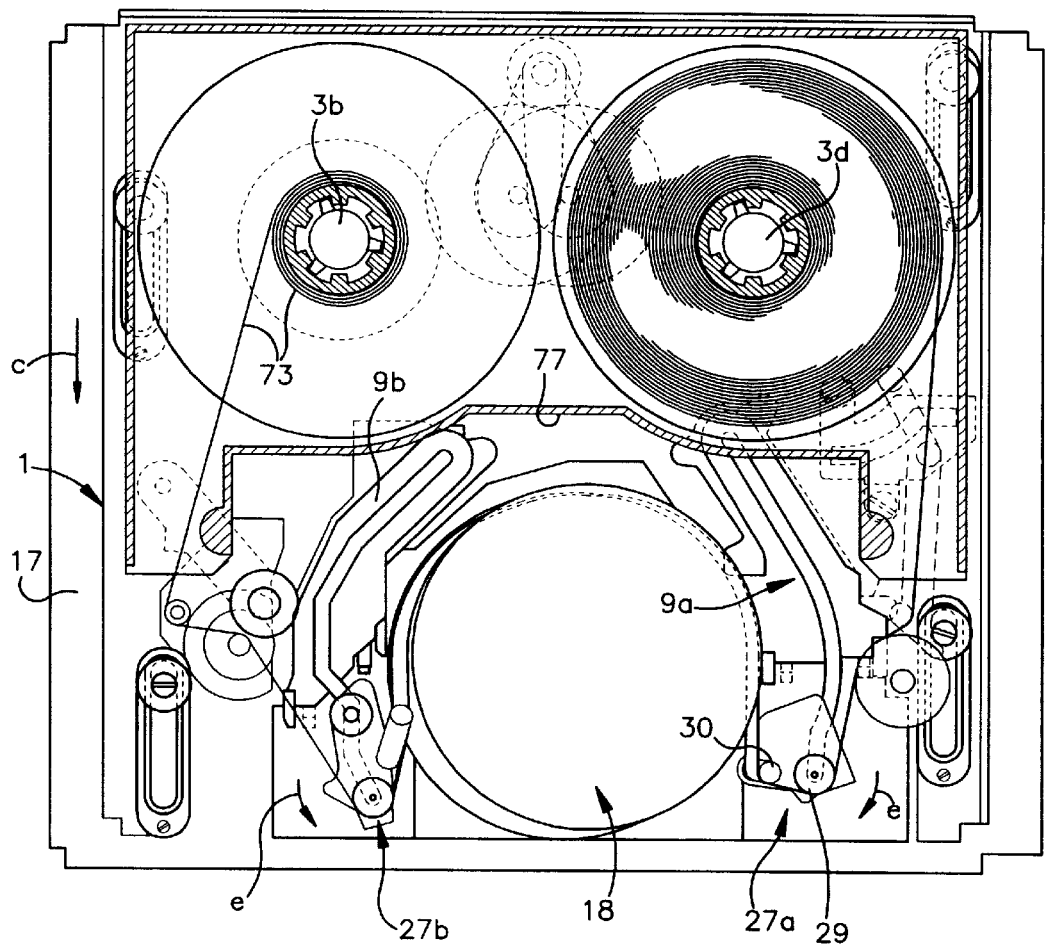
FIG. 38 illustrates the conventional magnetic recording/reproduction apparatus in a loaded position.

Referring to FIG. 36, in such a structure, the T boat 40 absorbs the play with respect to the rail 42 so that the tip 46a of the T1 post 46 is inclined toward the cylinder 38. The T1 post 46 has a height with respect to the cylinder 38 as illustrated in FIG. 38. Therefore, even when the T1 post 46 inadvertently interferes with the cylinder 38, the T1 post 46 does not interfere with the intermediate cylinder 38c or the head 38d mounted thereon because a lower end 46b of the tapered tip 46a of the T1 post 46 is in contact only with the lower cylinder 38b which does not rotate, and the portion of the T1 post 46 above the lower end 46b is tapered so as not to contact the cylinder.

FIG. 36 illustrates a main feature of the magnetic recording/reproduction apparatus according to the present embodiment of the invention. The rotary head cylinder of the present apparatus corresponds to the cylinder 38, the rotary head corresponds to the head 38d, the inclined post to the T1 post 46, the tape guide post carrier to the T boat 40, and the tapered shape to the tip 46a.

Figure 40:
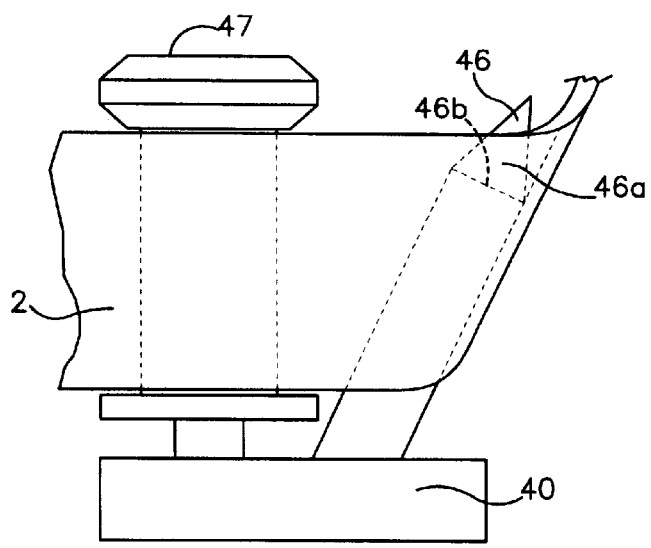
FIG. 40 illustrates a positional relationship between an inclined post and a magnetic tape.
Figure 37:
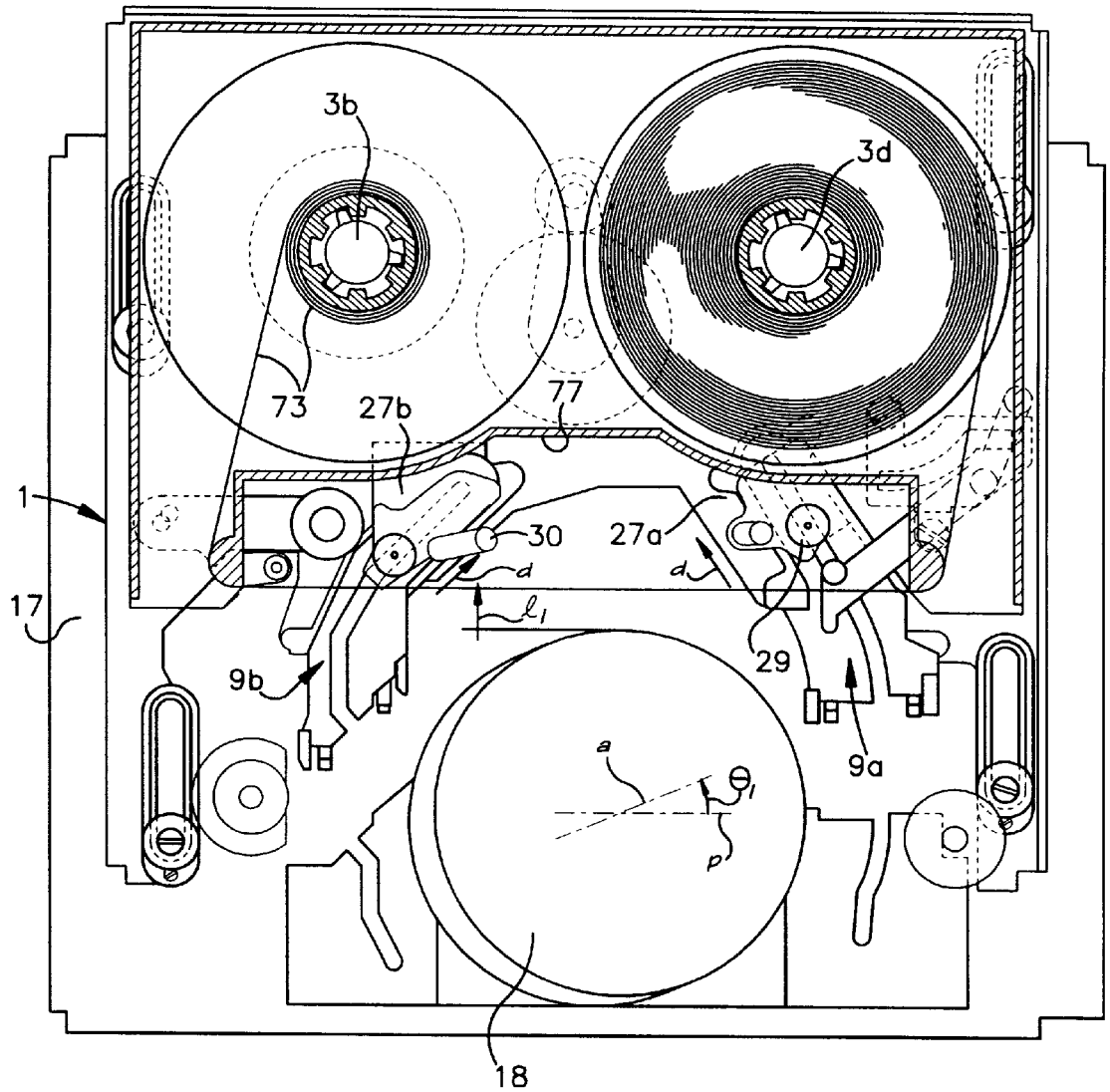
FIG. 37 illustrates a conventional magnetic recording/reproduction apparatus in an eject position.

In the present embodiment, the inclined post 46 has the tapered tip 46a such that its diameter decreases upwardly (i.e., away from the rail 42). Specifically, referring to FIG. 40, the base of the tapered tip 46a is below the upper edge of the magnetic tape. More specifically, the upper edge of the magnetic tape is between the base of the tapered tip 46a and the tip of the tapered tip 46a.

Figure 39:
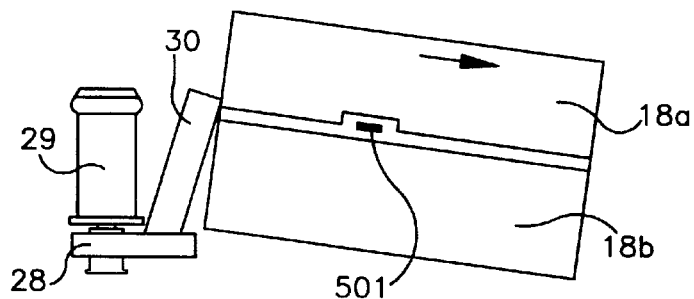
FIG. 39 illustrates a portion of a conventional magnetic recording/reproduction apparatus corresponding to the main feature of the present apparatus.

Therefore, the inclined post 46 of the present magnetic recording/reproduction apparatus has greater freedom in its inclination as compared with the inclined post 30 of the conventional magnetic recording/reproduction apparatus as Illustrated in FIG. 39. As a result, it is possible to reduce the size of the mechanism of the magnetic recording/reproduction apparatus without increasing the load of a tape loading operation.

Moreover, in the present embodiment, it is possible to prevent the inclined post 46 from inadvertently damaging the rotary head drum and the head during a tape loading operation. Even if the inclined post 46 moves in the direction indicated by A in FIG. 36, only a portion of the inclined post 46 at which the tapering of the post 46 starts (i.e., the junction between the cylindrical portion and the cone portion of the post 46) contacts the lower cylinder 38b, whereby the inclined post 46 does not damage the head 38d. As a result, it is possible to reduce the size of the mechanism of the magnetic recording/reproduction apparatus.

The magnetic recording/reproduction apparatus of the present invention provides an effect that it is possible to prevent the rotary head drum and the head from being inadvertently damaged during a tape loading operation, without increasing the size of the mechanism thereof or the load of the loading operation. Therefore, the magnetic recording/reproduction apparatus of the present invention provides a desirable effect that the mechanism thereof can be made small, the reliability of the apparatus is high, and the driving load of the loading operation is small.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A magnetic recording/reproduction apparatus for pulling out a magnetic tape from a cassette, forming a predetermined tape drive system with a group of tape guide posts while winding the magnetic tape around a rotary head cylinder, having a rotary head, for a predetermined arc, so as to perform recording/reproduction of the magnetic tape, the apparatus comprising:

an inclined post around which a non-magnetic side of the magnetic tape from the rotary head cylinder is wound;

a rail provided integrally with a base on which the rotary head cylinder is mounted; and a tape guide post carrier which has the inclined post mounted thereon and is guided along the rail, wherein:

the inclined post is inclined with respect to a tape driving direction; and the inclined post has a tapered tip portion whose diameter upwardly decreases, wherein an upper edge of the magnetic tape is between a base of the tapered tip portion and a tip of the tapered tip portion.

* * * * *